US012795116B2

(12) United States Patent
Teng et al.

(10) Patent No.: US 12,795,116 B2
(45) Date of Patent: Nov. 10, 2026

(54) ENCODING DEVICE, DECODING DEVICE, AND NON-TRANSITORY MACHINE-READABLE MEDIUM FOR ENCODING/DECODING VIDEO DATA

(71) Applicant: SHARP KABUSHIKI KAISHA, Sakai City (JP)

(72) Inventors: Chih-Yu Teng, New Taipei City (TW); Yu-Chiao Yang, New Taipei City (TW)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/306,320

(22) Filed: Aug. 21, 2025

(65) Prior Publication Data

US 2026/0059118 A1 Feb. 26, 2026

Related U.S. Application Data

(60) Provisional application No. 63/685,804, filed on Aug. 22, 2024.

(51) Int. Cl.

*H04N 19/159* (2014.01)
*H04N 19/105* (2014.01)
*H04N 19/176* (2014.01)
*H04N 19/196* (2014.01)

(52) U.S. Cl.

CPC ......... *H04N 19/159* (2014.11); *H04N 19/105* (2014.11); *H04N 19/176* (2014.11); *H04N 19/196* (2014.11)

(58) Field of Classification Search

None

See application file for complete search history.

(56) References Cited

U.S. PATENT DOCUMENTS

2023/0336718 A1* 10/2023 Lee ........................ H04N 19/11
2024/0137542 A1* 4/2024 Zhao ....................... H04N 19/11
2024/0275955 A1* 8/2024 Xie ...................... H04N 19/593

OTHER PUBLICATIONS

Series H: Audiovisual and multimedia systems Infrastructure of audiovisual services—Coding of moving video, Versatile video coding, ITU-T H.266 (V3) (Sep. 2023).

(Continued)

*Primary Examiner* — Jessica M Prince

(74) *Attorney, Agent, or Firm* — ScienBiziP, P.C.

(57) ABSTRACT

An electronic device for decoding/encoding video data is provided. The electronic device is configured to: receive the video data; determine a block unit from an image frame retrieved from the video data; construct a TIMD candidate list, including multiple intra prediction modes, for the block unit; determine a selected set of intra prediction modes from the intra prediction modes of the TIMD candidate list; substitute at least one intra prediction mode in the selected set of intra prediction modes with at least one matrix-based intra prediction mode to form a substituted set of intra prediction modes; determine multiple predicted samples of the block unit based on the substituted set of intra prediction modes; and reconstruct the block unit based on the predicted samples of the block unit. In addition, a non-transitory machine-readable medium for decoding/encoding video data is also provided.

19 Claims, 12 Drawing Sheets

(56) References Cited

OTHER PUBLICATIONS

Series H: Audiovisual and multimedia systems Infrastructure of audiovisual services—Coding of moving video, High efficiency video coding, ITU-T H.265 (V10) (Jul. 2024).

Series H: Audiovisual and multimedia systems Infrastructure of audiovisual services—Coding of moving video, Advanced video coding for generic audiovisual services, ITU-T H.264 (V15) (Aug. 2024).

* cited by examiner

ENCODING DEVICE, DECODING DEVICE, AND NON-TRANSITORY MACHINE-READABLE MEDIUM FOR ENCODING/DECODING VIDEO DATA

CROSS-REFERENCE TO RELATED APPLICATION(S)

The present disclosure claims the benefit of and priority to U.S. Provisional Patent Application Ser. No. 63/685,804, filed on Aug. 22, 2024, entitled "PROPOSED MATRIX-BASED PREDICTION WITH INTRA TEMPLATE MATCHING," the content of which is hereby incorporated herein fully by reference in its entirety into the present disclosure for all purposes.

FIELD

The present disclosure is generally related to video coding and, more specifically, to techniques for integrating matrix-based intra prediction modes into template-based intra mode derivation.

BACKGROUND

Video coding has become essential for efficient storage and transmission of digital media, enabling applications from streaming services to high-definition broadcasting. Standards like H.264/AVC, HEVC, and VVC have evolved to compress video data by exploiting spatial and temporal redundancies, dividing frames into blocks for prediction, transformation, quantization, and entropy coding. Intra prediction, a key component, generates predictions within the same frame using neighboring reconstructed samples, reducing data sent to the decoder. Common intra modes include directional modes (e.g., angular modes) simulating edges at various angles, non-directional modes (e.g., Planar and DC modes), and advanced tools such as most probable modes (MPMs) derived from adjacent blocks to minimize signaling overhead.

As video resolutions increase, intra prediction faces demands for higher accuracy with lower computational overhead. Template-based approaches have emerged, where modes are derived by evaluating costs on reconstructed template regions adjacent to the current block, allowing decoder-side mode selection without explicit signaling. Meanwhile, matrix-based modes apply weighted combinations of reference samples via predefined matrices, offering position-dependent predictions that can outperform traditional modes for certain block geometries.

However, limitations in balancing complexity and performance may be encountered. For instance, applying identical angular intra prediction modes across diverse block sizes, such as small 4×4 or large 32×32 blocks, often results in inefficiencies. Template evaluations, while effective, increase decoder-side computations if not optimized, potentially causing delays in real-time scenarios. Moreover, integrating diverse prediction tools risks redundancy or conflicts, where one mode's strengths (e.g., matrix flexibility) are underutilized against another's (e.g., template derivation speed), resulting in suboptimal compression ratios or elevated encoding times. These challenges highlight the need for refined harmonization strategies to maintain coding gains without exacerbating resource demands in modern video ecosystems.

SUMMARY

The present disclosure is directed to a device and method for integrating matrix-based intra prediction modes into template-based intra mode derivation (TIMD), aimed at improving compression efficiency and reducing coding complexity while maintaining high prediction accuracy across diverse block sizes.

According to a first aspect of the present disclosure, an electronic device for decoding video data is provided. The electronic device includes at least one processor and at least one non-transitory computer-readable medium coupled to the at least one processor and storing one or more computer-executable instructions. When executed by the at least one processor, the instructions cause the electronic device to: receive the video data; determine a block unit from an image frame retrieved from the video data; construct a TIMD candidate list for the block unit, the TIMD candidate list including multiple intra prediction modes; determine a selected set of intra prediction modes from the multiple intra prediction modes of the TIMD candidate list; substitute at least one intra prediction mode in the selected set of intra prediction modes with at least one matrix-based intra prediction mode to form a substituted set of intra prediction modes; determine multiple predicted samples of the block unit based on the substituted set of intra prediction modes; and reconstruct the block unit based on the multiple predicted samples of the block unit.

In an implementation of the first aspect, the one or more computer-executable instructions, when executed by the at least one processor, further cause the electronic device to: determine a template region for the block unit, the template region including at least one of a first region that is neighboring the block unit and above the block unit and a second region that is neighboring the block unit and to the left of the block unit, the template region being reconstructed as a template reconstruction; determine multiple template predictions of the template region based on the multiple intra prediction modes of the TIMD candidate list; calculate multiple template costs for the multiple intra prediction modes of the TIMD candidate list based on the template reconstruction and the multiple template predictions; and determine the selected set of intra prediction modes based on the multiple template costs.

In another implementation of the first aspect, the selected set of intra prediction includes multiple second intra prediction modes. Determining the multiple predicted samples of the block unit based on the substituted set of intra prediction modes includes: determining multiple weights for the multiple first intra prediction modes based on multiple template costs associated with the multiple first intra prediction modes; and determining the multiple predicted samples of the block unit based on the multiple weights and the multiple second intra prediction modes.

In another implementation of the first aspect, the selected set of intra prediction modes includes multiple first intra prediction modes. The substituted set of intra prediction modes includes multiple second intra prediction modes. Determining the multiple predicted samples of the block unit based on the substituted set of intra prediction modes includes: determining multiple weights for the multiple second intra prediction modes based on multiple template costs associated with the multiple second intra prediction modes; and determining the multiple predicted samples of the block unit based on the multiple weights and the multiple second intra prediction modes.

In another implementation of the first aspect, substituting the at least one intra prediction mode in the selected set of intra prediction modes with the at least one matrix-based intra prediction mode to form the substituted set of intra prediction modes includes: determining whether to substitute a first intra prediction mode in the selected set of intra prediction modes with a first matrix-based intra prediction mode associated with the first intra prediction mode based on a block size of the block unit and a mode type of the first intra prediction mode.

In another implementation of the first aspect, substituting the at least one intra prediction mode in the selected set of intra prediction modes with the at least one matrix-based intra prediction mode to form the substituted set of intra prediction modes further includes: substituting the first intra prediction mode in the selected set of intra prediction modes with the first matrix-based intra prediction mode associated with the first intra prediction mode when each of a block width and a block height is smaller than or equal to 16 pixels, and when the mode type is one of a planar mode, a direct current (DC) mode, and an angular mode having a mode index of (2+2*k), where k is a positive constant.

In another implementation of the first aspect, substituting the at least one intra prediction mode in the selected set of intra prediction modes with the at least one matrix-based intra prediction mode to form the substituted set of intra prediction modes further includes: substituting the first intra prediction mode in the selected set of intra prediction modes with the first matrix-based intra prediction mode associated with the first intra prediction mode when at least one of a block width and a block height is greater than or equal to 32 pixels, and when the mode type is one of a planar mode, a DC mode, and an angular mode having a mode index of (2+4*k), where k is a positive constant.

In another implementation of the first aspect, substituting the at least one intra prediction mode in the selected set of intra prediction modes with the at least one matrix-based intra prediction mode includes: decoding a flag from the video data; and determining whether to substitute a first intra prediction mode in the selected set of intra prediction modes with a first matrix-based intra prediction mode associated with the first intra prediction mode based on the flag.

In another implementation of the first aspect, constructing the TIMD candidate list for the block unit includes: including a planar mode, a DC mode, multiple angular modes, at least one block vector candidate and multiple most probable modes into the TIMD candidate list. The at least one block vector candidate is determined based on multiple neighboring blocks of the block unit.

According to a second aspect of the present disclosure, an electronic device for encoding video data is provided. The electronic device includes: at least one processor; and at least one non-transitory computer-readable medium coupled to the at least one processor and storing one or more computer-executable instructions. When executed by the at least one processor, the instructions cause the electronic device to: receive the video data; determine a block unit from an image frame retrieved from the video data; construct a TIMD candidate list for the block unit, the TIMD candidate list including multiple intra prediction modes; determine a selected set of intra prediction modes from the multiple intra prediction modes of the TIMD candidate list; substitute at least one intra prediction mode in the selected set of intra prediction modes with at least one matrix-based intra prediction mode to form a substituted set of intra prediction modes; determine multiple predicted samples of the block unit based on the substituted set of intra prediction modes; and reconstruct the block unit based on the multiple predicted samples of the block unit.

In an implementation of the second aspect, the one or more computer-executable instructions, when executed by the at least one processor, further cause the electronic device to: determine a template region for the block unit, the template region including at least one of a first region that is neighboring the block unit and above the block unit and a second region that is neighboring the block unit and to the left of the block unit, and the template region being reconstructed as a template reconstruction; determine multiple template predictions of the template region based on the multiple intra prediction modes of the TIMD candidate list; calculate multiple template costs for the multiple intra prediction modes of the TIMD candidate list based on the template reconstruction and the multiple template predictions; and determine the selected set of intra prediction modes based on the multiple template costs.

In another implementation of the second aspect, the selected set of intra prediction includes multiple second intra prediction modes. Determining the multiple predicted samples of the block unit based on the substituted set of intra prediction modes includes: determining multiple weights for the multiple first intra prediction modes based on multiple template costs associated with the multiple first intra prediction modes; and determining the multiple predicted samples of the block unit based on the multiple weights and the multiple second intra prediction modes.

In another implementation of the second aspect, the selected set of intra prediction modes includes multiple first intra prediction modes. The substituted set of intra prediction modes includes multiple second intra prediction modes. Determining the multiple predicted samples of the block unit based on the substituted set of intra prediction modes includes: determining multiple weights for the multiple second intra prediction modes based on multiple template costs associated with the multiple second intra prediction modes; and determining the multiple predicted samples of the block unit based on the multiple weights and the multiple second intra prediction modes.

In another implementation of the second aspect, substituting the at least one intra prediction mode in the selected set of intra prediction modes with the at least one matrix-based intra prediction mode to form the substituted set of intra prediction modes includes: determining whether to substitute a first intra prediction mode in the selected set of intra prediction modes with a first matrix-based intra prediction mode associated with the first intra prediction mode based on a block size of the block unit and a mode type of the first intra prediction mode.

In another implementation of the second aspect, substituting the at least one intra prediction mode in the selected set of intra prediction modes with the at least one matrix-based intra prediction mode to form the substituted set of intra prediction modes further includes: substituting the first intra prediction mode in the selected set of intra prediction modes with the first matrix-based intra prediction mode associated with the first intra prediction mode when each of a block width and a block height is smaller than or equal to 16 pixels, and when the mode type is one of a planar mode, a DC mode, and an angular mode having a mode index of (2+2*k), where k is a positive constant.

In another implementation of the second aspect, substituting the at least one intra prediction mode in the selected set of intra prediction modes with the at least one matrix-based intra prediction mode to form the substituted set of intra prediction modes further includes: substituting the first intra prediction mode in the selected set of intra prediction modes with the first matrix-based intra prediction mode associated with the first intra prediction mode when at least one of a block width and a block height is greater than or equal to 32 pixels, and when the mode type is one of a planar mode, a DC mode, and an angular mode having a mode index of (2+4*k), where k is a positive constant.

In another implementation of the second aspect, substituting the at least one intra prediction mode in the selected set of intra prediction modes with the at least one matrix-based intra prediction mode includes: encoding a flag into a bitstream, the flag indicating the at least one intra prediction mode.

In another implementation of the second aspect, constructing the TIMD candidate list for the block unit includes: including a planar mode, a DC mode, multiple angular modes, at least one block vector candidate and multiple most probable modes into the TIMD candidate list. The at least one block vector candidate is determined based on multiple neighboring blocks of the block unit.

According to a third aspect of the present disclosure, a non-transitory machine-readable medium of an electronic device is provided. The non-transitory machine-readable medium stores one or more computer-executable instructions for decoding video data. The one or more computer-executable instructions, when executed by at least one processor of the electronic device, cause the electronic device to: receive the video data; determine a block unit from an image frame retrieved from the video data; construct a TIMD candidate list for the block unit, the TIMD candidate list including multiple intra prediction modes; determine a selected set of intra prediction modes from the multiple intra prediction modes of the TIMD candidate list; substitute at least one intra prediction mode in the selected set of intra prediction modes with at least one matrix-based intra prediction mode to form a substituted set of intra prediction modes; determine multiple predicted samples of the block unit based on the substituted set of intra prediction modes; and reconstruct the block unit based on the multiple predicted samples of the block unit.

BRIEF DESCRIPTION OF THE DRAWINGS

Aspects of the present disclosure are best understood from the following detailed disclosure and the corresponding figures. Various features are not drawn to scale and dimensions of various features may be arbitrarily increased or reduced for clarity of discussion.

DETAILED DESCRIPTION

Figure 1:
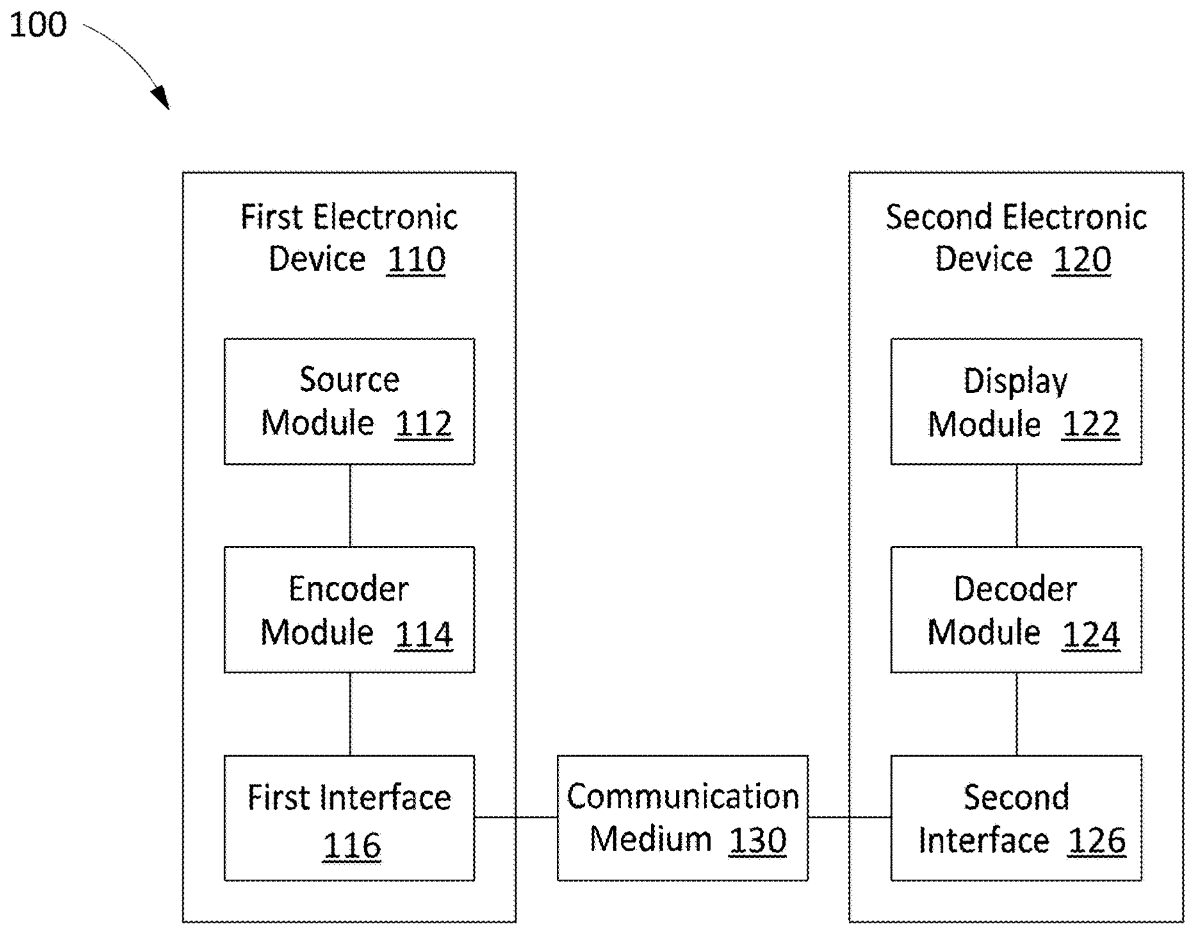
FIG. 1 is a block diagram illustrating a system having a first electronic device and a second electronic device for encoding and decoding video data, in accordance with one or more example implementations of this disclosure.

The following disclosure contains specific information pertaining to implementations in the present disclosure. The figures and the corresponding detailed disclosure are directed to example implementations. However, the present disclosure is not limited to these example implementations. Other variations and implementations of the present disclosure will occur to those skilled in the art.

Unless noted otherwise, like or corresponding elements among the figures may be indicated by like or corresponding reference designators. The figures and illustrations in the present disclosure are generally not to scale and are not intended to correspond to actual relative dimensions.

For the purposes of consistency and case of understanding, features are identified (although, in some examples, not illustrated) by reference designators in the exemplary figures. However, the features in different implementations may differ in other respects and shall not be narrowly confined to what is illustrated in the figures.

The present disclosure uses the phrases "in one implementation," or "in some implementations," which may refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, and the equivalent.

For purposes of explanation and non-limitation, specific details, such as functional entities, techniques, protocols, and standards, are set forth for providing an understanding of the disclosed technology. Detailed disclosure of well-known methods, technologies, systems, and architectures are omitted so as not to obscure the present disclosure with unnecessary details.

Persons skilled in the art will recognize that any disclosed coding function(s) or algorithm(s) described in the present disclosure may be implemented by hardware, software, or a combination of software and hardware. Disclosed functions may correspond to modules that are software, hardware, firmware, or any combination thereof.

A software implementation may include a program having one or more computer-executable instructions stored on a computer-readable medium, such as memory or other types of storage devices. For example, one or more microprocessors or general-purpose computers with communication processing capability may be programmed with computer-executable instructions and perform the disclosed function(s) or algorithm(s).

The microprocessors or general-purpose computers may be formed of application-specific integrated circuits (ASICs), programmable logic arrays, and/or one or more digital signal processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium includes, but is not limited to, random-access memory (RAM), read-only memory (ROM), erasable programmable read-only memory (EPROM), electrically erasable programmable read-only memory (EEPROM), flash memory, compact disc read-only memory (CD ROM), magnetic cassettes, magnetic tape, magnetic disk storage, or any other equivalent medium capable of storing computer-executable instructions. The computer-readable medium may be a non-transitory computer-readable medium.

FIG. 1 is a block diagram illustrating a system 100 having a first electronic device and a second electronic device for encoding and decoding video data, in accordance with one or more example implementations of this disclosure.

The system 100 includes a first electronic device 110, a second electronic device 120, and a communication medium 130.

The first electronic device 110 may be a source device including any device configured to encode video data and transmit the encoded video data to the communication medium 130. The second electronic device 120 may be a destination device including any device configured to receive encoded video data via the communication medium 130 and decode the encoded video data.

The first electronic device 110 may communicate via wire, or wirelessly, with the second electronic device 120 via the communication medium 130. The first electronic device 110 may include a source module 112, an encoder module 114, and a first interface 116, among other components. The second electronic device 120 may include a display module 122, a decoder module 124, and a second interface 126, among other components. The first electronic device 110 may be a video encoder and the second electronic device 120 may be a video decoder.

The first electronic device 110 and/or the second electronic device 120 may be a mobile phone, a tablet, a desktop, a notebook, or other electronic devices. FIG. 1 illustrates one example of the first electronic device 110 and the second electronic device 120. The first electronic device 110 and second electronic device 120 may include greater or fewer components than illustrated or have a different configuration of the various illustrated components.

The source module 112 may include a video capture device to capture new video, a video archive to store previously captured video, and/or a video feed interface to receive the video from a video content provider. The source module 112 may generate computer graphics-based data, as the source video, or may generate a combination of live video, archived video, and computer-generated video, as the source video. The video capture device may include a charge-coupled device (CCD) image sensor, a complementary metal-oxide-semiconductor (CMOS) image sensor, or a camera.

The encoder module 114 and the decoder module 124 may each be implemented as any one of a variety of suitable encoder/decoder circuitry, such as one or more microprocessors, a central processing unit (CPU), a graphics processing unit (GPU), a system-on-a-chip (SoC), digital signal processors (DSPs), application-specific integrated circuits (ASICs), field-programmable gate arrays (FPGAs), discrete logic, software, hardware, firmware, or any combinations thereof. When implemented partially in software, a device may store the program having computer-executable instructions for the software in a suitable, non-transitory computer-readable medium and execute the stored computer-executable instructions using one or more processors to perform the disclosed methods. Each of the encoder module 114 and the decoder module 124 may be included in one or more encoders or decoders, any of which may be integrated as part of a combined encoder/decoder (CODEC) in a device.

The first interface 116 and the second interface 126 may utilize customized protocols or follow existing standards or de facto standards including, but not limited to, Ethernet, IEEE 802.11 or IEEE 802.15 series, wireless USB, or telecommunication standards including, but not limited to, Global System for Mobile Communications (GSM), Code-Division Multiple Access 2000 (CDMA2000), Time Division Synchronous Code Division Multiple Access (TD-SCDMA), Worldwide Interoperability for Microwave Access (WiMAX), Third Generation Partnership Project Long-Term Evolution (3GPP-LTE), or Time-Division LTE (TD-LTE). The first interface 116 and the second interface 126 may each include any device configured to transmit a compliant video bitstream via the communication medium 130 and to receive the compliant video bitstream via the communication medium 130.

The first interface 116 and the second interface 126 may include a computer system interface that enables a compliant video bitstream to be stored on a storage device or to be received from the storage device. For example, the first interface 116 and the second interface 126 may include a chipset supporting Peripheral Component Interconnect (PCI) and Peripheral Component Interconnect Express (PCIe) bus protocols, proprietary bus protocols, Universal Serial Bus (USB) protocols, Inter-Integrated Circuit (I2C) protocols, or any other logical and physical structure(s) that may be used to interconnect peer devices.

The display module 122 may include a display using liquid crystal display (LCD) technology, plasma display technology, organic light-emitting diode (OLED) display technology, or light-emitting polymer display (LPD) technology, with other display technologies used in some other implementations. The display module 122 may include a High-Definition display or an Ultra-High-Definition display.

Figure 2:
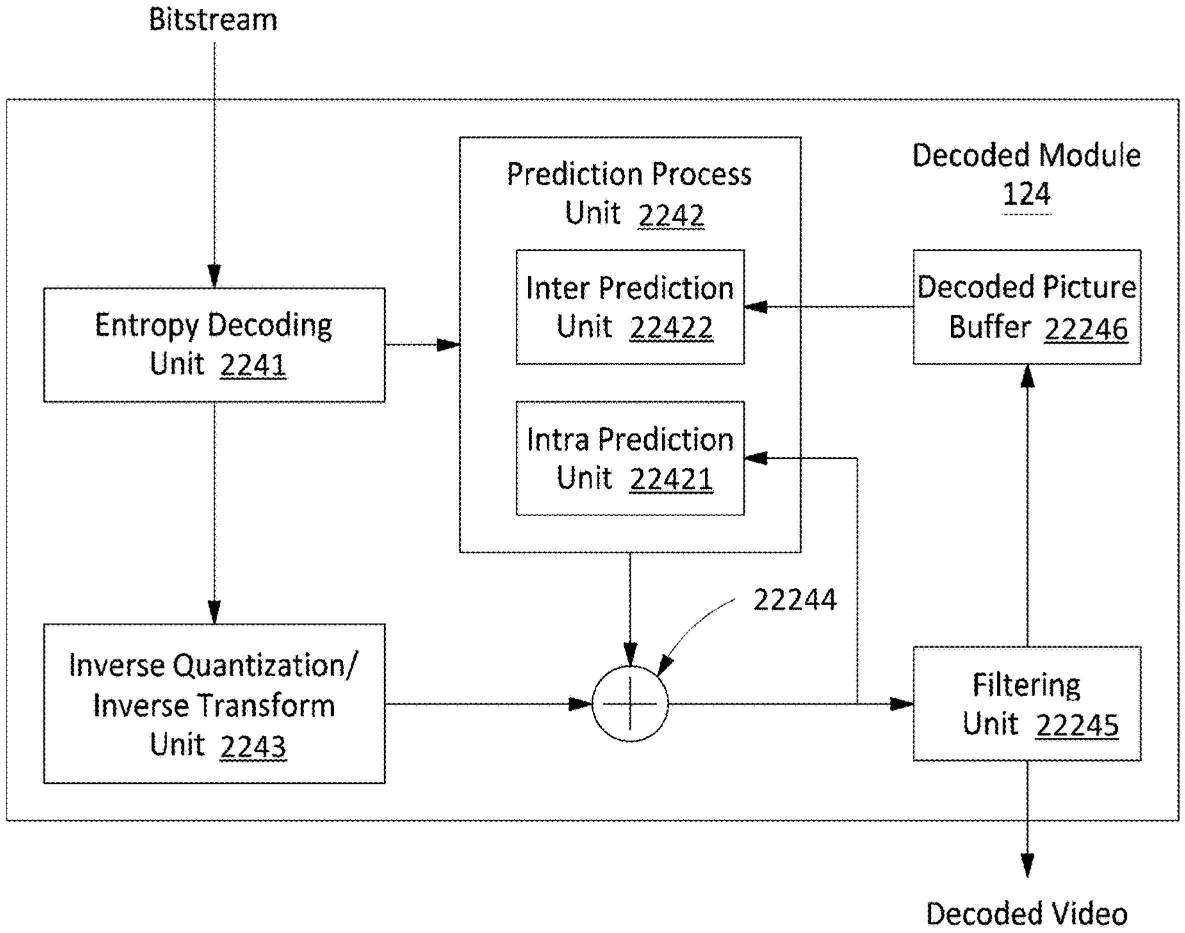
FIG. 2 is a block diagram illustrating a decoder module of the second electronic device illustrated in FIG. 1, in accordance with one or more example implementations of this disclosure.

FIG. 2 is a block diagram illustrating a decoder module 124 of the second electronic device 120 illustrated in FIG. 1, in accordance with one or more example implementations of this disclosure. The decoder module 124 may include an entropy decoder (e.g., an entropy decoding unit 2241), a prediction processor (e.g., a prediction processing unit 2242), an inverse quantization/inverse transform processor (e.g., an inverse quantization/inverse transform unit 2243), a summer (e.g., a summer 2244), a filter (e.g., a filtering unit 2245), and a decoded picture buffer (e.g., a decoded picture buffer 2246). The prediction processing unit 2242 further may include an intra prediction processor (e.g., an intra prediction unit 22421) and an inter prediction processor (e.g., an inter prediction unit 22422). The decoder module 124 receives a bitstream, decodes the bitstream, and outputs a decoded video.

The entropy decoding unit 2241 may receive the bitstream including multiple syntax elements from the second interface 126, as shown in FIG. 1, and perform a parsing operation on the bitstream to extract syntax elements from the bitstream. As part of the parsing operation, the entropy decoding unit 2241 may entropy decode the bitstream to generate quantized transform coefficients, quantization parameters, transform data, motion vectors, intra modes, partition information, and/or other syntax information.

The entropy decoding unit 2241 may perform context-adaptive variable length coding (CAVLC), context-adaptive binary arithmetic coding (CABAC), syntax-based context-adaptive binary arithmetic coding (SBAC), probability interval partitioning entropy (PIPE) coding, or another entropy coding technique to generate the quantized transform coefficients. The entropy decoding unit 2241 may provide the quantized transform coefficients, the quantization parameters, and the transform data to the inverse quantization/inverse transform unit 2243 and provide the motion vectors, the intra modes, the partition information, and other syntax information to the prediction processing unit 2242.

The prediction processing unit 2242 may receive syntax elements, such as motion vectors, intra modes, partition information, and other syntax information, from the entropy decoding unit 2241. The prediction processing unit 2242 may receive the syntax elements including the partition information and divide image frames according to the partition information.

Each of the image frames may be divided into at least one image block according to the partition information. The at least one image block may include a luminance block for reconstructing multiple luminance samples and at least one chrominance block for reconstructing multiple chrominance samples. The luminance block and the at least one chrominance block may be further divided to generate macroblocks, coding tree units (CTUs), coding blocks (CBs), subdivisions thereof, and/or other equivalent coding units.

During the decoding process, the prediction processing unit 2242 may receive predicted data including the intra mode or the motion vector for a current image block of a specific one of the image frames. The current image block may be the luminance block or one of the chrominance blocks in the specific image frame.

The intra prediction unit 22421 may perform intra-predictive coding of a current block unit relative to one or more neighboring blocks in the same frame as the current block unit based on syntax elements related to the intra mode in order to generate a predicted block. The intra mode may specify the location of reference samples selected from the neighboring blocks within the current frame. The intra prediction unit 22421 may reconstruct multiple chroma components of the current block unit based on multiple luma components of the current block unit when the multiple chroma components is reconstructed by the prediction processing unit 2242.

The intra prediction unit 22421 may reconstruct multiple chroma components of the current block unit based on the multiple luma components of the current block unit when the multiple luma components of the current block unit are reconstructed by the prediction processing unit 2242.

The inter prediction unit 22422 may perform inter-predictive coding of the current block unit relative to one or more blocks in one or more reference image blocks based on syntax elements related to the motion vector in order to generate the predicted block.

The motion vector may indicate a displacement of the current block unit within the current image block relative to a reference block unit within the reference image block. The reference block unit may be a block (e.g., in a reference frame) determined to closely match the current block unit.

The inter prediction unit 22422 may receive the reference image block stored in the decoded picture buffer 2246 and reconstruct the current block unit based on the received reference image blocks.

The inverse quantization/inverse transform unit 2243 may apply inverse quantization and inverse transformation to reconstruct the residual block in the pixel domain. The inverse quantization/inverse transform unit 2243 may apply inverse quantization to the residual quantized transform coefficient to generate a residual transform coefficient and then apply inverse transformation to the residual transform coefficient to generate the residual block in the pixel domain.

The inverse transformation may be inversely applied by the transformation process, such as a discrete cosine transform (DCT), a discrete sine transform (DST), an adaptive multiple transform (AMT), a mode-dependent non-separable secondary transform (MDNSST), a Hypercube-Givens transform (HyGT), a signal-dependent transform, a Karhunen-Loéve transform (KLT), a wavelet transform, an integer transform, a sub-band transform, or a conceptually similar transform. The inverse transformation may convert the residual information from a transform domain, such as a frequency domain, back to the pixel domain, etc. The degree of inverse quantization may be modified by adjusting a quantization parameter.

The summer 2244 may add the reconstructed residual block (e.g., residual samples of the block) to the predicted block (e.g., predicted samples of the block) provided by the prediction processing unit 2242 to produce a reconstructed block.

The filtering unit 2245 may include a deblocking filter, a sample adaptive offset (SAO) filter, a bilateral filter, and/or an adaptive loop filter (ALF) to remove the blocking artifacts from the reconstructed block. Additional filters (in loop or post loop) may also be used in addition to the deblocking filter, the SAO filter, the bilateral filter, and the ALF. Such filters (which are not explicitly illustrated for the brevity of description) may filter the output of the summer 2244. The filtering unit 2245 may output the decoded video to the display module 122 or other video receiving units after the filtering unit 2245 performs the filtering process for the reconstructed blocks of the specific image frame.

The decoded picture buffer 2246 may be a reference picture memory that stores the reference block to be used by the prediction processing unit 2242 in decoding the bitstream (e.g., in inter-coding modes). The decoded picture buffer 2246 may be formed by any one of a variety of memory devices, such as a dynamic random-access memory (DRAM), including synchronous DRAM (SDRAM), magneto-resistive RAM (MRAM), resistive RAM (RRAM), or other types of memory devices. The decoded picture buffer 2246 may be on-chip along with other components of the decoder module 124 or may be off-chip relative to those components.

Figure 3:
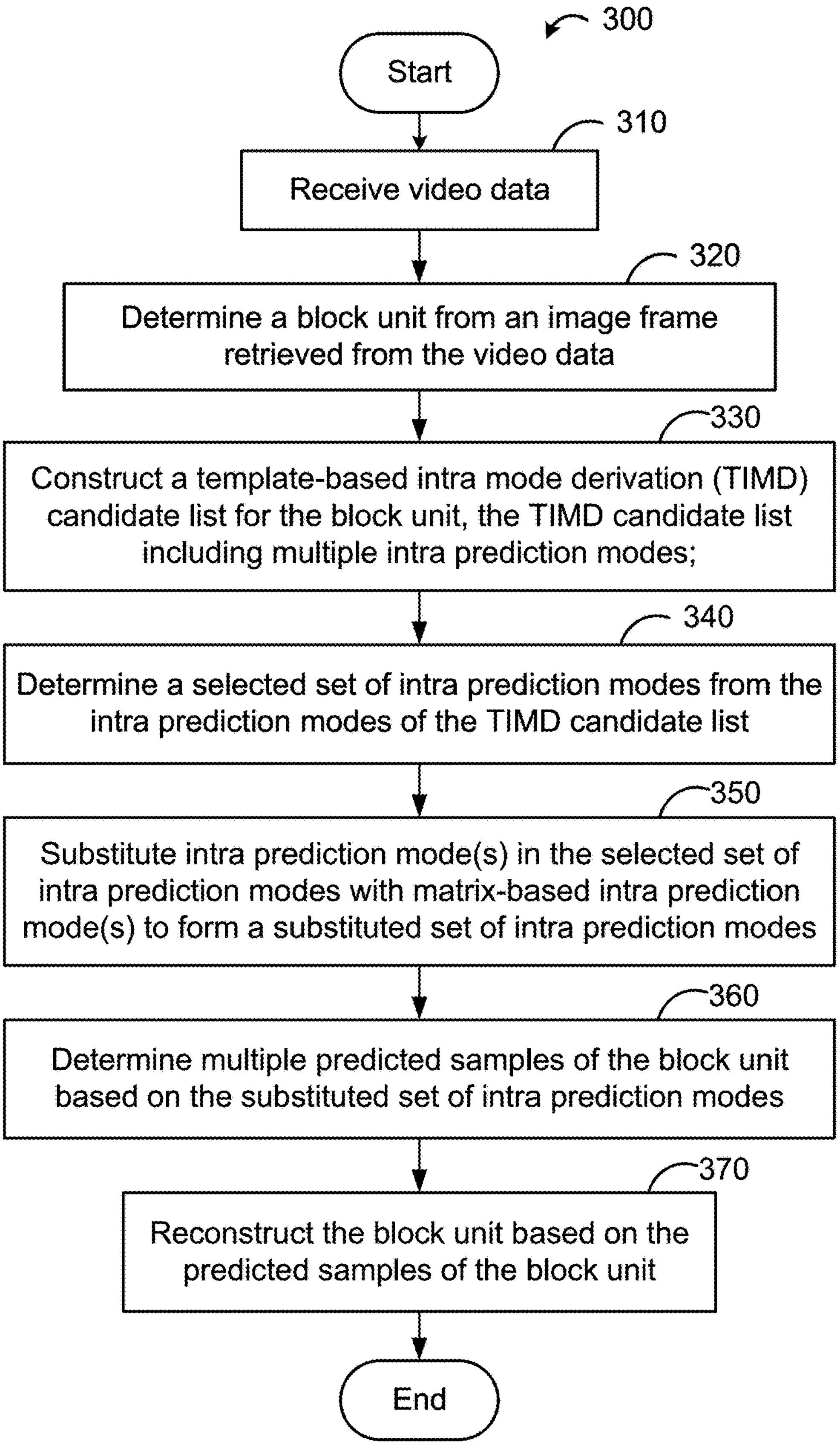
FIG. 3 is a flowchart illustrating a method/process for decoding and/or encoding video data by an electronic device, in accordance with one or more example implementations of this disclosure.

FIG. 3 is a flowchart illustrating a method/process 300 for decoding and/or encoding video data by an electronic device, in accordance with one or more example implementations of this disclosure. The method/process 300 is an example implementation, as there may be a variety of methods of decoding/encoding the video data.

The method/process 300 may be performed by an electronic device, such as the electronic device 110 or electronic device 120, using the configurations illustrated in FIGS. 1 and 2, where various elements of these figures may be referenced to describe the method/process 300. Each block illustrated in FIG. 3 may represent one or more processes, methods, or subroutines performed by an electronic device.

The order in which the blocks appear in FIG. 3 is for illustration only, and may not be construed to limit the scope of the present disclosure, thus may be different from what is illustrated. Additional blocks may be added or fewer blocks may be utilized without departing from the scope of the present disclosure.

At block 310, the method/process 300 may start by receiving (e.g., by the decoder module 124) the video data. The video data received by the decoder module 124 may include a bitstream provided by the encoder module 114, which may include information of multiple image frames.

With reference to FIG. 1 and FIG. 2, the second electronic device 120 may receive the bitstream from an encoder, such as the first electronic device 110, or from other video providers, via the second interface 126. The second interface 126 may provide the bitstream to the decoder module 124.

The entropy decoding unit 2241 may decode the bitstream to determine multiple prediction indications and multiple partitioning indications for multiple video images. The decoder module 124 may then reconstruct the video images based on the prediction indications and the partitioning indications. The prediction indications and the partitioning indications may include multiple flags and multiple indices.

At block 320, the method/process 300 may determine (e.g., by the decoder module 124), a block unit from an image frame retrieved from the video data. Specifically, the video data may include the bitstream received from the encoder, and a block unit may be determined from an image frame of the bitstream.

With reference to FIG. 1 and FIG. 2, the decoder module 124 may determine or retrieve the image frames from the bitstream and may divide each image frame to determine the block units according to the partition indications in the bitstream. For example, the decoder module 124 may divide the image frames to generate multiple CTUs, and further divide one of the CTUs to determine the block units according to the partition indications using any video coding standard.

In some implementations, the block unit may be a current block. For example, the current block may include at least one of a coding unit, a prediction unit, a macroblock, a luma block, and a chroma block.

At block 330, the method/process 300 may construct (e.g., by the decoder module 124) a template-based intra mode derivation (TIMD) candidate list for the block unit. The TIMD candidate list may include multiple intra prediction modes. The intra prediction unit 22421 may construct the TIMD candidate list by including the intra prediction modes.

In some implementations, the multiple intra prediction modes included in the TIMD candidate list may include non-angular mode(s), such as a Planar mode, a DC mode, and/or at least one block vector candidate.

In some implementations, the multiple intra prediction modes included in the TIMD candidate list may further include multiple (e.g., intra) angular modes.

In some implementations, the intra prediction modes included in the TIMD candidate list may further include multiple most probable modes (MPMs). The MPMs may be included in an MPM list that includes intra prediction mode(s) of neighboring block(s) of the block unit and/or multiple decoder-side intra mode derivation (DIMD) modes. For example, the neighboring block(s) may include one or more of the adjacent blocks. As another example, the neighboring block(s) may include one or more of the adjacent blocks and the non-adjacent blocks.

Figure 4:
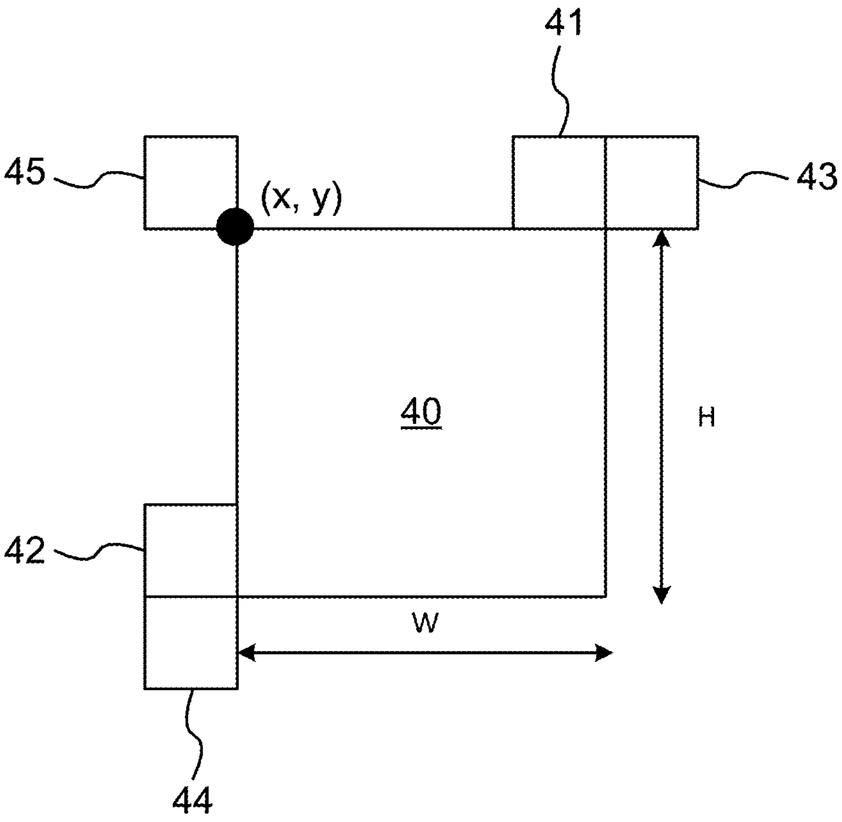
FIG. 4 is a diagram illustrating adjacent blocks of a block unit, in accordance with one or more example implementations of this disclosure.
Figure 5:
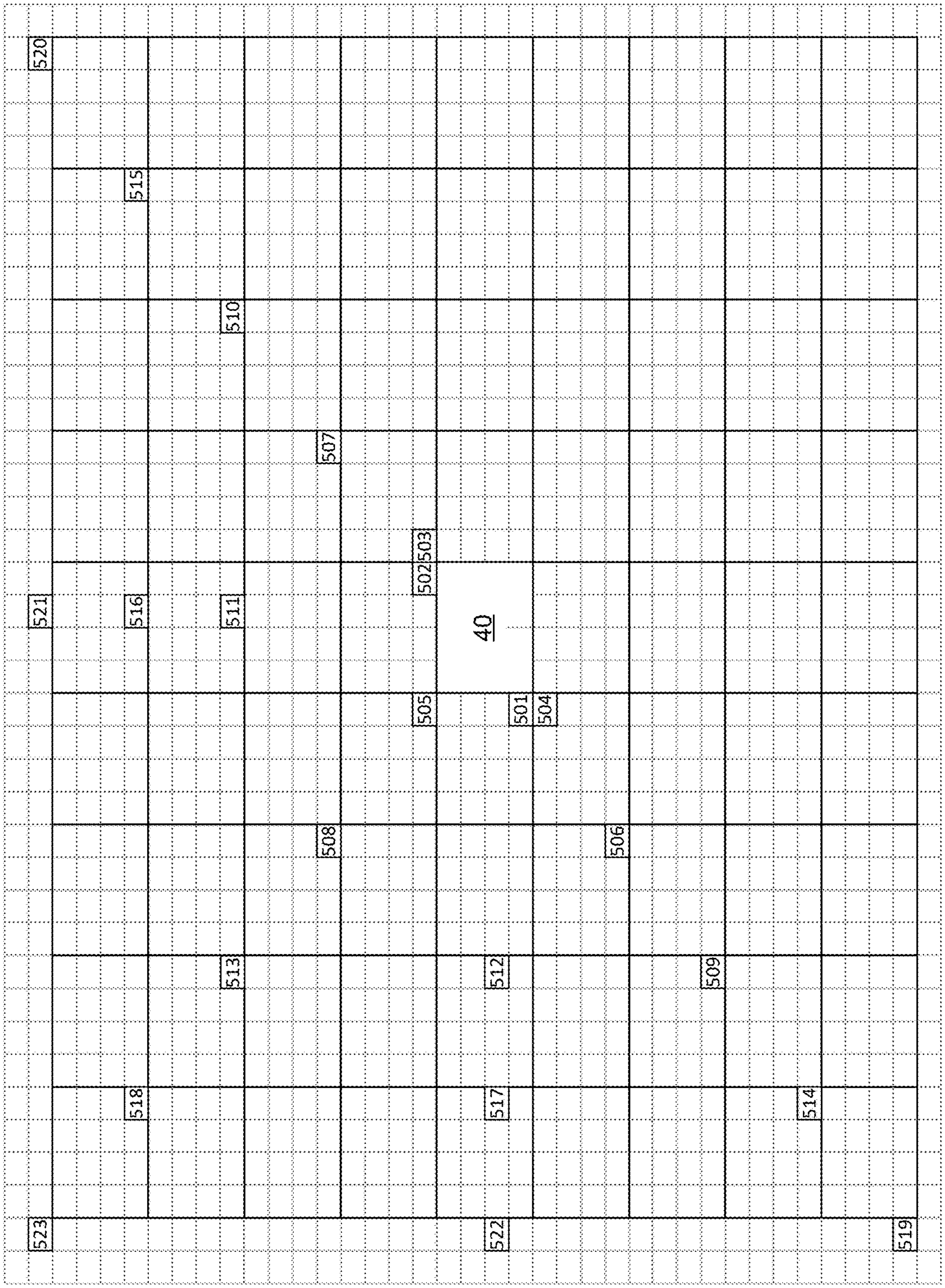
FIG. 5 is a diagram illustrating adjacent and non-adjacent blocks of a block unit, in accordance with one or more example implementations of this disclosure.

FIG. 4 is a diagram illustrating adjacent blocks of a block unit, in accordance with one or more example implementations of this disclosure. FIG. 5 is a diagram illustrating adjacent and non-adjacent blocks of the block unit, in accordance with one or more example implementations of this disclosure.

Referring to FIG. 4, adjacent blocks of the block unit 40 may include a top block 41, a left block 42, a top-right block 43, a bottom-left block 44, and a top-left block 45. The position of the top-left corner of the block unit 40 may be (x, y), the width of the block unit 40 may be W, and the height of the block unit 40 may be H, where W and H are positive integers. The top block 41 may be a block including a sample located at (x+W−1, y−1), the left block 42 may be a block including a sample located at (x−1, y+H−1), the top-right block 43 may be a block including a sample located at (x+W, y−1), the bottom-left block 44 may be a block including a sample located at (x−1, y+H), and the top-left block 45 may be a block including a sample located at (x−1, y−1).

Referring to FIG. 5, blocks 501 to 505 may be the adjacent blocks of the block unit 40, as described in FIG. 4. Blocks 506 to 523 may be the non-adjacent blocks of the block unit 40 (e.g., which may be the same as that defined for the inter merge mode). The distances between the non-adjacent (coded) blocks 506 to 523 and the block unit 40 may be determined based on the width and height of block unit 40.

However, the definition of neighboring blocks (e.g., including adjacent blocks and/or non-adjacent blocks) of a block unit is not limited to that described with reference to FIGS. 4 and 5. A person of ordinary skill in the art may adopt different definitions as needed, e.g., depending on the coding standard or implementation.

In some implementations, the intra prediction modes included in the TIMD candidate list may include at least one block vector candidate.

In some implementations, one neighboring block (e.g., a first neighboring block) of the block unit may be coded by an inter block copy (IBC) or an intra template matching prediction (IntraTMP). The block vector (e.g., a first block vector) of the neighboring block may be included in the TIMD candidate list.

In some implementations, a cascaded block vector may be determined based on the block vector (e.g., the first block vector) of the neighboring block (e.g., the first neighboring block) and may be included in the TIMD candidate list. Specifically, the block vector (e.g., the first block vector) of neighboring block (e.g., the first neighboring block) may (e.g., directly or indirectly) indicate a reference block, which may be coded by the IBC or IntraTMP. The block vector (e.g., a second block vector) of the reference block may be the cascaded block vector and may be included in the TIMD candidate list.

At block 340, the method/process 300 may determine (e.g., by the decoder module 124) a selected set of intra prediction modes from the intra prediction modes of the TIMD candidate list. The selected set of intra prediction modes may include N intra prediction mode(s), which may be referred to as first intra prediction mode(s) in the present disclosure. N may be, for example, a positive integer, such as 1, 2, or 3, etc.

In some implementations, the number N may be predefined or may be determined from the bitstream that is associated with the video data.

In some implementations, the decoder module 124 may determine the selected set of intra prediction modes based on template cost(s) of the intra prediction modes in the TIMD candidate list. Specifically, the decoder module 124 may calculate a template cost for each intra prediction mode in the TIMD, and may select N intra prediction modes, as the selected set based on the template cost.

Figure 6:
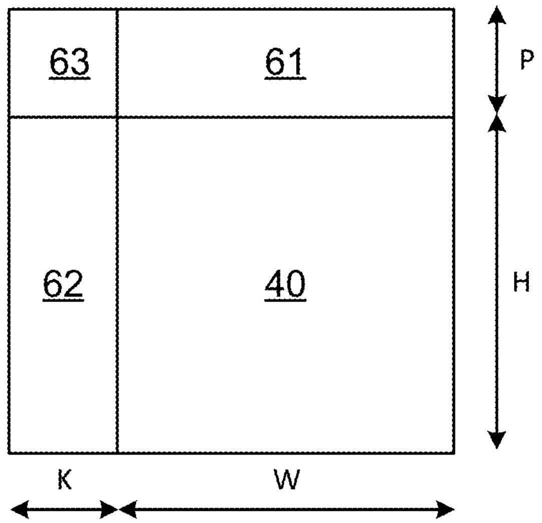
FIG. 6 is a diagram illustrating template regions of a block unit, in accordance with one or more example implementations of this disclosure.

FIG. 6 is a diagram illustrating template regions of a block unit, in accordance with one or more example implementations of this disclosure.

Referring to FIG. 6, the decoder module 124 may determine a template region for the block unit 40 for determining the template cost. The template region may include at least one of a first region 61 neighboring the block unit 40 and above the block unit 40 and a second region 62 that is also neighboring the block unit 40, but to the left of the block unit 40. In some implementations, the template region may further include the third region 63 which is located at above, and to the left, of the block unit 40.

In some implementations, the height P of the first region 61 may be pre-defined as 1, 2, 3, 4, 8, 12, 16, or 32. In some implementations, the height P of the first region 61 may be equal to the height H of the block unit 40. In some implementations, the height P of the first region 61 may be determined based on the height H of the block unit 40. For example, the height H may be greater than 8, and the height P may be equal to 4. As another example, the height H may be less than, or equal to, 8, and the height P may be equal to 2.

In some implementations, the width K of the second region 62 may be pre-defined as 1, 2, 3, 4, 8, 12, 16, or 32. In some implementations, the width K of the second region 62 may be equal to the width W of the block unit 40. In some implementations, the width K of the second region 62 may be determined based on the width W of the block unit 40. For example, the width W may be greater than 8, and the width K may be equal to 4. As another example, the width W may be less than, or equal to, 8, and the width K may be equal to 2.

In some implementations, the third region 63 may have the same height P, as the first region 61, and the same width K, as the second region 62.

In some implementations, the template region, determined by the decoder module 124 for determining the template cost, may include the first region 61 and the second region 62, but excluding the third region 63. In some implementations, the template region, determined by the decoder module 124 for determining the template cost, may include the second region 62 and the third region 63, but excluding the first region 61. In some implementations, the template region, determined by the decoder module 124 for determining the template cost, may include the second region 62 only (e.g., if the first region 61 is not available for the block unit 40). In some implementations, the template region, determined by the decoder module 124 for determining the template cost, may include the first region 61 and the third region 63, but excluding the second region 62. In some implementations, the template region, determined by the decoder module 124 for determining the template cost, may include the first region 61 only (e.g., if the second region 62 is not available for the block unit 40). In some implementations, the template region, determined by the decoder module 124 for determining the template cost, may include all of the first, second, and third regions 61, 62, 63.

Figure 7:
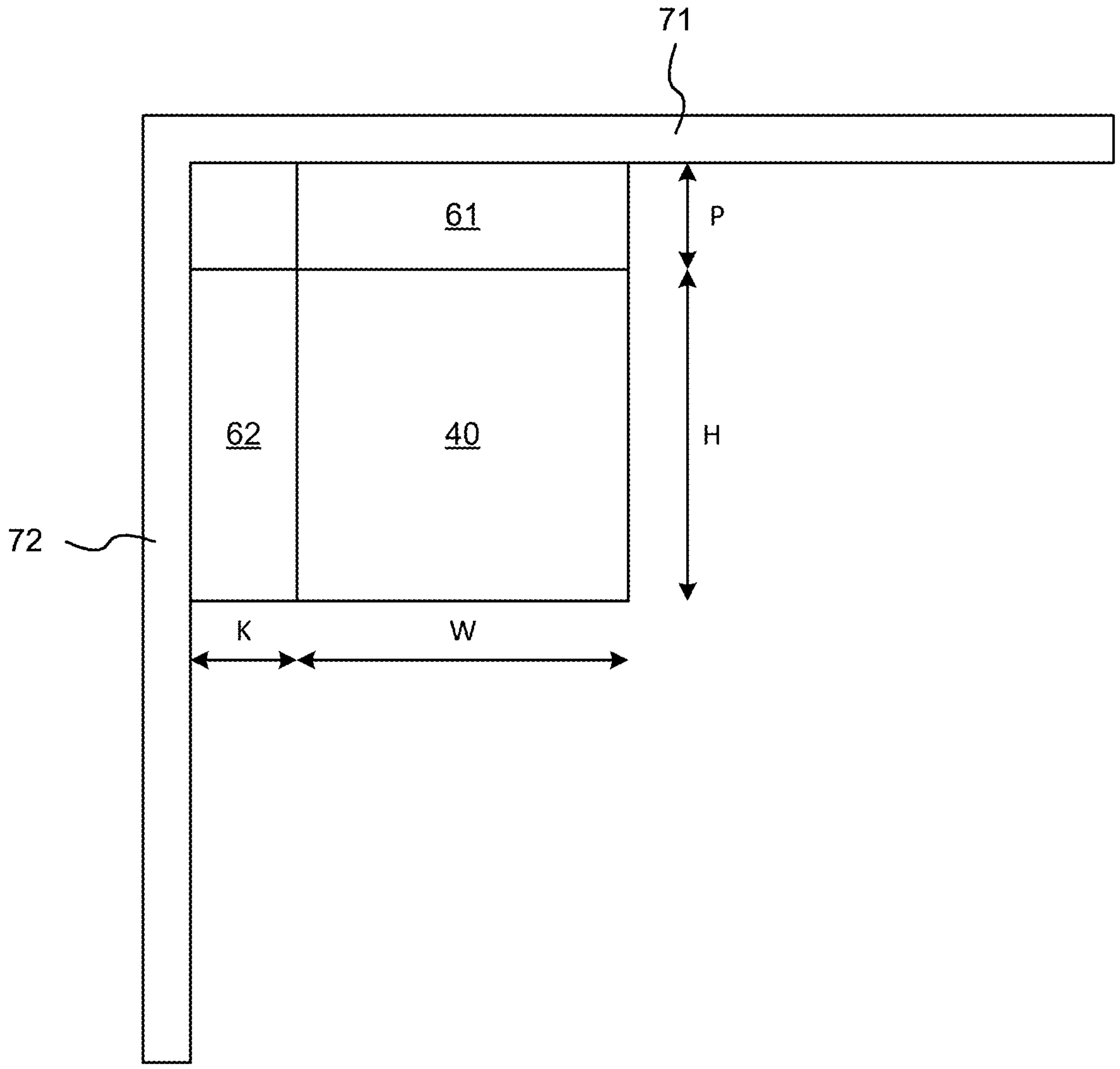
FIG. 7 is a diagram illustrating a calculation of a template cost, in accordance with one or more example implementations of this disclosure.

FIG. 7 is a diagram illustrating a calculation of a template cost, in accordance with one or more example implementations of this disclosure.

Referring to FIG. 7, the template region may be exemplified as including the first region 61 and the second region 62. After determining the template region, the decoder module 124 may calculate a template prediction for each intra prediction mode included in the TIMD candidate list. The template region may be reconstructed as a template reconstruction prior to such calculation. In other words, both the first region 61 and the second region 62 may include a set of reconstructed samples. In some implementations, for each intra prediction mode included in the TIMD candidate list, a template prediction of the template region (e.g., including the first region 61 and the second region 62) may be determined based on reference lines 71, 72 of the template regions. In some implementations, the reference lines 71, 72 may include samples that are neighboring the template region.

In some implementations, for each intra prediction mode included in the TIMD candidate list, a template cost may be determined based on the corresponding template reconstruction and the corresponding template prediction. For example, the template cost may be determined by calculating a difference between the template prediction and the template reconstruction using a specific metric, such as the Sum of Absolute Differences (SAD), the Sum of Absolute Transformed Differences (SATD), the Mean Removal Sum of Absolute Difference (MRSAD), or the Mean Square Error (MSE).

In some implementations, the decoder module 124 may select N intra prediction mode(s) from the TIMD candidate list, as the selected set based on the template cost. For example, N intra prediction mode(s) corresponding to the N smallest template cost(s) may be selected and included in the selected set.

At block 350, the method/process 300 may substitute (e.g., by the decoder module 124) at least one intra prediction mode in the selected set of intra prediction modes with at least one matrix-based intra prediction mode to form a substituted set of intra prediction modes. It should be noted that the at least one matrix-based intra prediction mode may correspond (e.g., on a one-to-one basis) to the substituted at least one intra prediction mode, and each matrix-based intra prediction mode may employ a corresponding predefined weight matrix. The substituted set of intra prediction modes may also include N intra prediction mode(s), which may be referred to as second intra prediction mode(s) in the present disclosure.

In some implementations, the matrix-based intra prediction mode may be position dependent. Specifically, one matrix-based intra prediction mode (e.g., a first matrix-based intra prediction mode) may be used to determine a prediction of a block unit 40 (e.g., to generate predicted samples of the block unit 40) based on a weight matrix and a reference region, as expressed by the following equation:

$$P(x, y) = \sum_n F(x, y, n) * r(n)$$

In the above equation, P(x, y) may indicate the predicted sample at the position (x, y) of the block unit 40, r(n) may indicate the n-th reconstructed sample in the reference region, F(x, y, n) may indicate the weight of the n-th reconstructed sample in the reference region and located at the position (x, y) in the weight matrix, and n may be an index to indicate the sample in the reference region.

Figure 8:
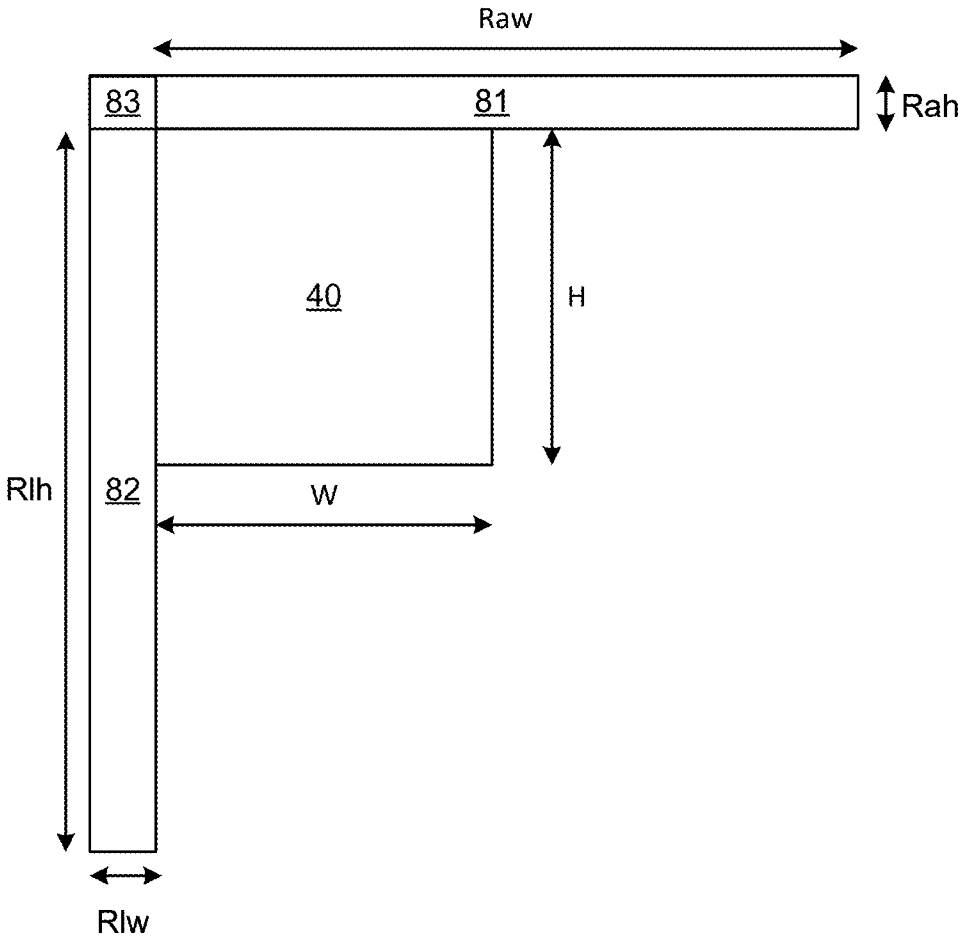
FIG. 8 is a diagram illustrating a reference region of a block unit, in accordance with one or more example implementations of this disclosure.

FIG. 8 is a diagram illustrating a reference region of a block unit, in accordance with one or more example implementations of this disclosure.

In some implementations, the reference region may include an above reference region 81, a left reference region 82 and/or an above-left reference region 83, as shown in FIG. 8. The size of the reference region may be determined based on the block size of the block unit 40 and the associated mode type (e.g., the conventional intra mode index).

In some implementations, the height Rah of the above reference region 81 and the width Rlw of the left reference region 82 may be determined based on the block size of the block unit 40. For example, the height Rah of the above reference region 81 and the width Rlw of the left reference region 82 may be equal to 2, if both of the width W and the height H of the block unit 40 are smaller than, or equal to, 16. As another example, the height Rah of the above reference region 81 and the width Rlw of the left reference region 82 may be equal to 1, if one of the width W or height H of the block unit 40 is greater than, or equal to, 32.

For example, the height Rah of the above reference region 81 and the width Rlw of the left reference region 82 may be equal to 2 when the block size of the block unit 40 is 16*16, 16*8, 16*4, 8*16, 8*8, 8*4, 4*16, 4*8, or 4*4.

For example, the height Rah of the above reference region 81 and the width Rlw of the left reference region 82 may be equal to 1 when the block size of the block unit 40 is 16*32, 32*16 or 32*32.

In some implementations, the width Raw of the above reference region 81 and the height Rlh of the left reference region 82 may be determined based on the associated mode type (e.g., the conventional intra mode index) of the intra prediction mode which is replaced by the matrix-based intra prediction mode.

In some implementations, the width Raw of the above reference region 81 may be equal to the width W of the block unit 40, and the height Rlh of the left reference region 82 may be equal to the height H of the block unit 40 if the associated conventional intra mode index of the intra prediction mode, which is replaced by the matrix-based intra prediction mode, is greater than 18 and less than 50.

In some implementations, the width Raw of the above reference region 81 may be twice the width W of the block unit 40 and the height Rlh of the left reference region 82 may be twice the height H of the block unit 40 if the associated conventional intra mode index of the intra prediction mode, which is replaced by the matrix-based intra prediction mode, is less than 18 or greater than 50.

In some implementations, the weight matrix may be pre-defined. Each of the conventional intra modes with each block size described above, may correspond to a weight matrix and each weight matrix may be different from the other ones. Each weight matrix may be used at both decoder side and encoder side. In some implementations, the weight matrix may be pre-trained, for example, by a neural-network (NN) and may be pre-defined in both encoder side and decoder side.

In some implementations, for each intra prediction mode in the selected set of intra prediction modes, the decoder module 124 may decode a corresponding flag from the video data, and determine whether to substitute the intra prediction mode with a corresponding/associated matrix-based intra prediction mode based on the flag. For the encoder side, the determination of substitution may be made based on the following criteria, and the flag indicating which first intra prediction mode(s) are substituted may be encoded into the bitstream.

In some implementations, for each intra prediction mode in the selected set, the decoder module 124 may determine whether to substitute the intra prediction mode with a corresponding/associated matrix-based intra prediction mode based on some criteria associated with a block size of the block unit 40 and a mode type of the intra prediction mode. In response to a positive determination, the decoder module 124 may perform the replacement in the selected set. By traversing the selected set in this manner, a substituted set of intra prediction modes may be obtained. The above-mentioned criteria will be described below.

For example, a Planar mode, a DC mode, and angular modes (2+4*k) may be determined to be substituted with a corresponding matrix-based intra prediction mode when one of the width W or height H of the block unit 40 is greater than, or equal to, 32, where k may be a non-negative integer, e.g., ranging from 0 to 16. For example, the replacement may be performed for the Planar mode, the DC mode, and the angular modes (2+4*k) when the block size of the block unit 40 is 16*32, 32*16, or 32*32.

For example, a Planar mode, a DC mode, and angular modes (2+8*k) may be determined to be substituted with the corresponding matrix-based intra prediction mode when one of the width W or height H of the block unit 40 is greater than, or equal to, 32, where k may be a non-negative integer, e.g., ranging from 0 to 8. For example, the replacement may be performed for the Planar mode, the DC mode, and the angular modes (2+8*k) when the block size of the block unit 40 is 16*32, 32*16, or 32*32.

For example, a Planar mode, a DC mode, and angular modes (2+2*k) may be determined to be substituted with the corresponding matrix-based intra prediction mode when both the width W and height H of the block unit 40 are smaller than, or equal to, 16, where k may be a non-negative integer, e.g., ranging from 0 to 32. For example, the replacement may be performed for the Planar mode, the DC mode, and the angular modes (2+2*k) when the block size of the block unit 40 is 16*16, 16*8, 16*4, 8*16, 8*8, 8*4, 4*16, 4*8, or 4*4.

For example, a Planar mode, a DC mode, and angular modes (2+4*k) may be determined to be substituted with the corresponding matrix-based intra prediction mode when both the width W and height H of the block unit 40 are smaller than, or equal to, 16, where k may be a non-negative integer, e.g., ranging from 0 to 16. For example, the replacement may be performed for the Planar mode, the DC mode, and the angular modes (2+4*k) when the block size of the block unit 40 is 16*16, 16*8, 16*4, 8*16, 8*8, 8*4, 4*16, 4*8, or 4*4.

Returning to FIG. 3, at block 360, the method/process 300 may determine (e.g., by the decoder module 124) a prediction of the block unit 40 based on the substitute set of intra prediction modes. Specifically, the decoder module 124 may determine multiple predicted samples of the block unit 40 using the intra prediction mode(s) included in the substituted set.

In some implementations, the decoder module 124 may determine multiple predicted samples of the block unit 40 using one intra prediction mode.

In some implementations, the decoder module 124 may determine multiple predicted samples of the block unit using more than one (e.g., 2 or 3) intra prediction mode. In such a case, the prediction may require a weighted blending process.

In some implementations, weights for the weighted blending process may be determined based on the template costs corresponding to the first intra prediction modes which have been calculated previously (e.g., when determining the selected set at block 340). In other words, the calculation of the weights may not take into account any matrix-based intra prediction mode(s) that are substituted.

Figure 9:
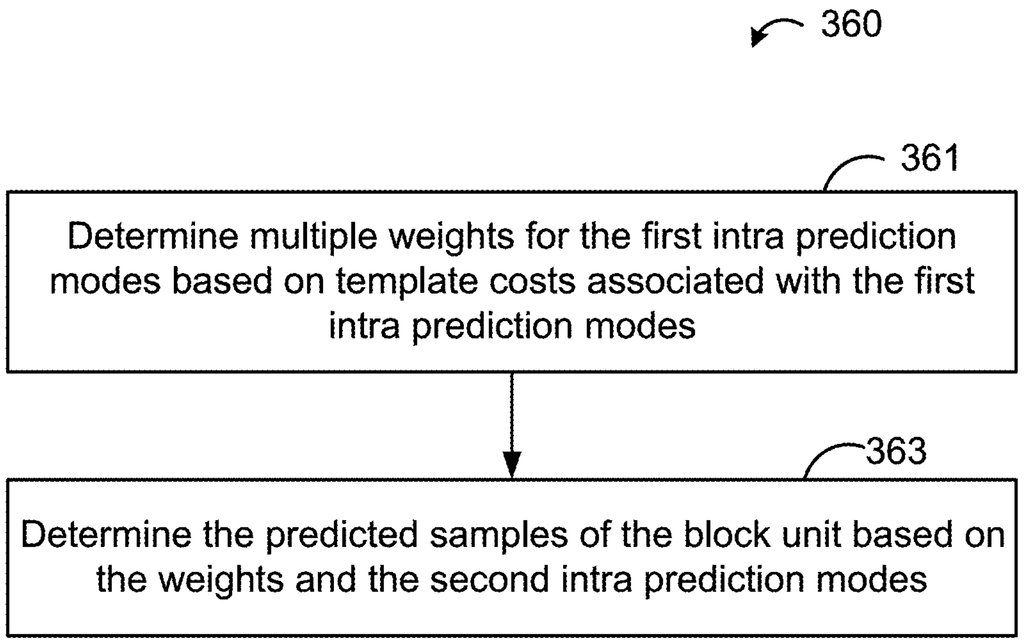
FIG. 9 is a flowchart illustrating a method/process for predicting a block unit, in accordance with one or more example implementations of this disclosure.

FIG. 9 is a flowchart illustrating a method/process for predicting a block unit, in accordance with one or more example implementations of this disclosure.

Referring to FIG. 9, in some implementations, block 360 may include blocks 361 and 363. At block 361, the decoder module 124 may determine the weights for the first intra prediction modes based on the template costs associated with the first intra prediction modes. At block 363, the decoder module 124 may determine the predicted samples of the block unit 40 based on the determined weights and the second intra prediction modes.

For example, the selected set of intra prediction modes may include a first mode, a second mode, and a third mode. A first template cost, a second template cost, and a third template cost corresponding to the first mode, the second mode, and the third mode may have been calculated (e.g., when determining the selected set at block 340). A first weight (e.g., $w_1$), a second weight (e.g., $w_2$), and a third weight (e.g., $w_3$) may be calculated based on the first, second, and third template costs, respectively. Assuming the first mode is replaced with a matrix-based intra prediction mode (e.g., referred to as a fourth mode) corresponding to the first mode, the predicted samples P of the block unit 40 may be obtained by weighted blending of a first prediction (e.g., $p_1$) of the block unit 40 determined using the fourth mode, a second prediction (e.g., $p_2$) determined using the second mode, and a third prediction (e.g., $p_3$) determined using the third mode, with the first, second, and third weights, respectively, as given by:

$$P = w_1 \cdot p_1 + w_2 \cdot p_2 + w_3 \cdot p_3.$$

In some implementations, weights for the weighted blending process may be determined based on the template costs corresponding to the second intra prediction modes, which may include one or more matrix-based intra prediction modes. In other words, the template costs for the substituted matrix-based intra prediction modes may be calculated and taken into account when determining the weights. Accordingly, for a matrix-based intra prediction mode that replaces one of the first intra prediction modes, an additional calculation of the corresponding template cost may be performed for determining the weights.

Figure 10:
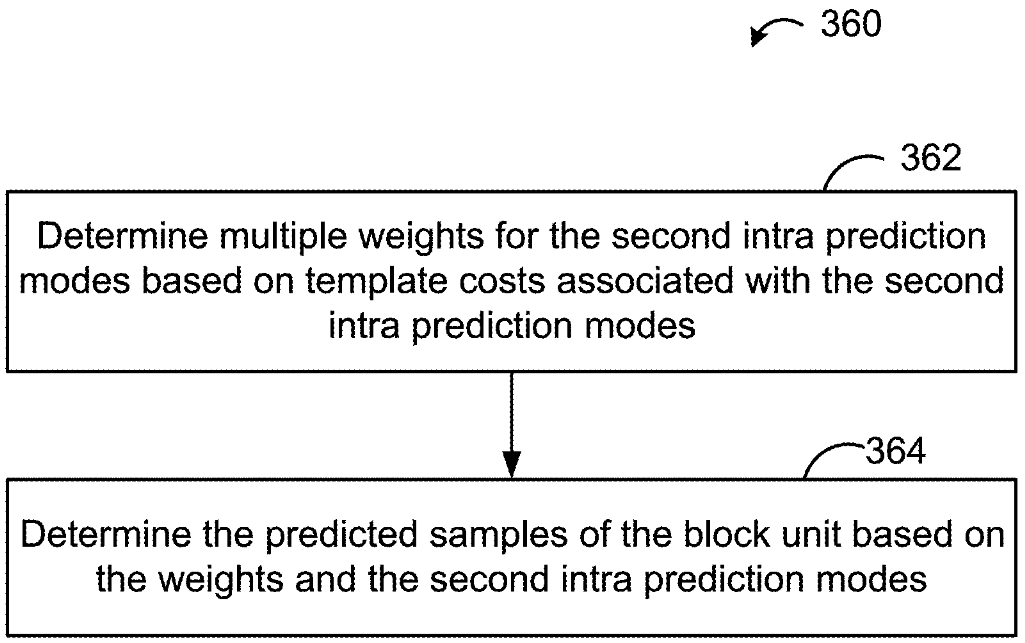
FIG. 10 is a flowchart illustrating a method/process for predicting a block unit, in accordance with one or more example implementations of this disclosure.

FIG. 10 is a flowchart illustrating a method/process for predicting a block unit, in accordance with one or more example implementations of this disclosure.

Referring to FIG. 10, in some implementations, block 360 may include blocks 362 and 364. At block 362, the decoder module 124 may determine the weights for the second intra prediction modes based on the template costs associated with the second intra prediction modes. At block 364, the decoder module 124 may determine the predicted samples of the block unit 40 based on the determined weights and the second intra prediction modes.

For example, the selected set of intra prediction modes may include a first mode, a second mode, and a third mode, assuming the first mode is replaced by a corresponding matrix-based intra prediction mode (e.g., referred to as a fourth mode). A second template cost and a third template cost corresponding to the second mode and third modes may have been calculated (e.g., when determining the selected set at block 340). A fourth template cost corresponding to the fourth mode may be calculated after mode substitution (e.g., at block 350). As such, a first weight (e.g., $w_1$), a second weight (e.g., $w_2$), and a third weight (e.g., $w_3$) may be determined based on the fourth, second, and third template costs. The predicted samples P of the block unit 40 may then be obtained by weighted blending of a first prediction ($p_1$) determined using the fourth mode, a second prediction ($p_2$) determined using the second mode, and a third prediction ($p_3$) determined using the third mode, with the first, second, and third weights, respectively, as given by:

$$P = w_1 \cdot p_1 + w_2 \cdot p_2 + w_3 \cdot p_3.$$

In some implementations, a template cost corresponding to a matrix-based intra prediction mode may be determined based on the template region and template reference regions associated with the template region.

Figure 11A:
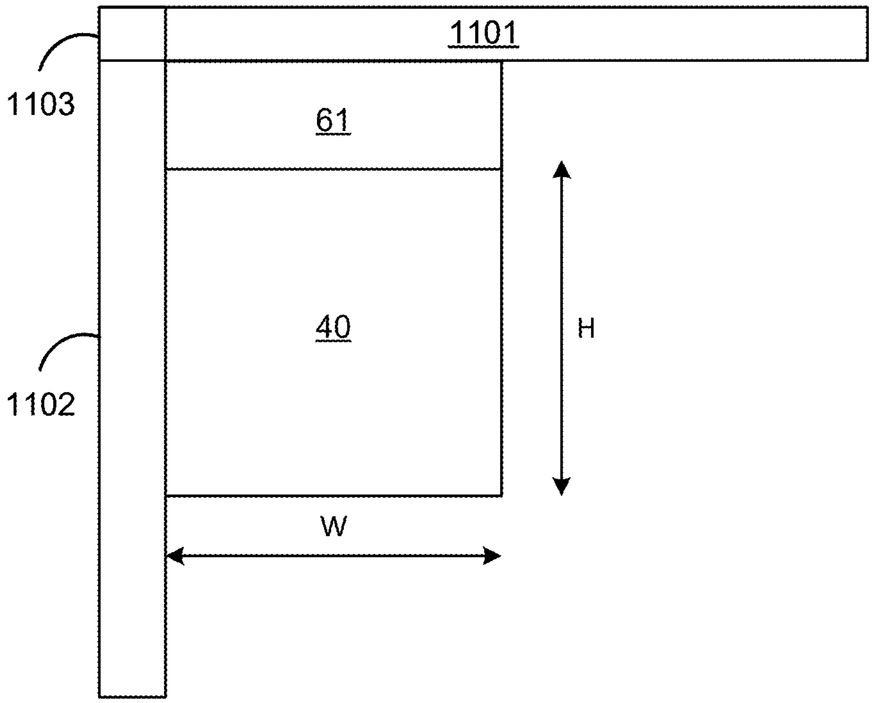
FIGS. 11A and 11B are diagrams illustrating configurations of template reference regions for calculating a template cost for a matrix-based intra prediction mode, in accordance with one or more example implementations of this disclosure.
Figure 11B:
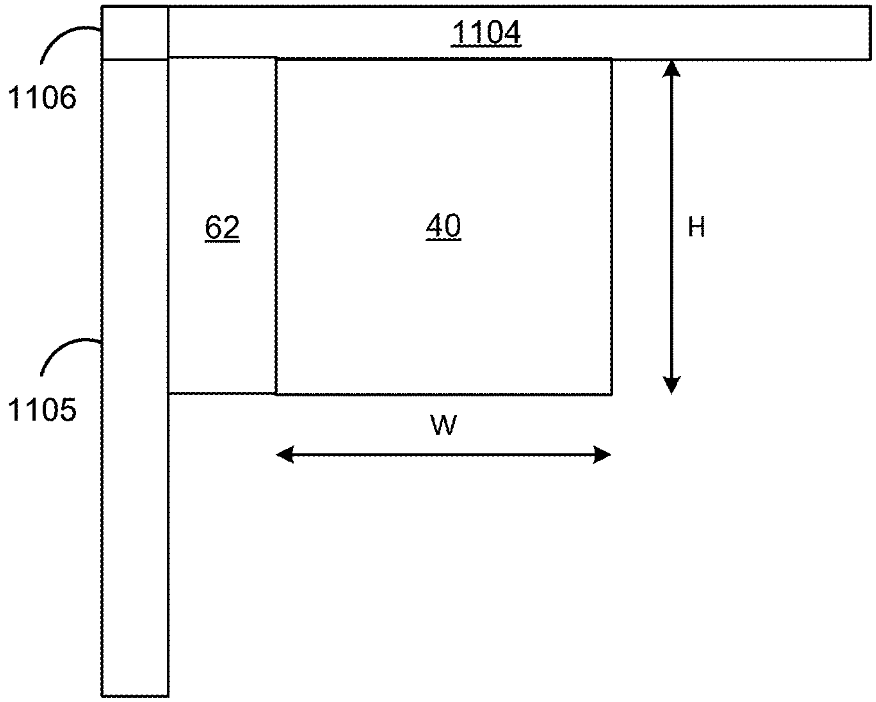

FIGS. 11A and 11B are diagrams illustrating configurations of template reference regions for calculating a template cost for a matrix-based intra prediction mode, in accordance with one or more example implementations of this disclosure.

Referring to FIG. 11A, when the template region includes the first region 61, the template reference region may include an above template reference region 1101, a left template reference region 1102, and/or an above-left template reference region 1103. The above template reference region 1101 may refer to a region located above the first region 61. The left template reference region 1102 may refer to a region located to the left of the first region 61. The above-left template reference region 1103 may refer to a region located diagonally above and to the left of the first region 61.

Referring to FIG. 11B, when the template region includes the second region 62, the template reference region may include an above template reference region 1104, a left template reference region 1105, and/or an above-left template reference region 1106. The above template reference region 1104 may refer to a region located above the second region 62. The left template reference region 1105 may refer to a region located to the left of the second region 62. The above-left template reference region 1106 may refer to a region located diagonally above and to the left of the second region 62.

In some implementations, the size of the template reference region may be determined based on the replaced first intra prediction mode (e.g., the conventional intra mode index) and the size of the template region.

For example, the height of the above template reference region 1101/1104 and the width of the left template reference region 1102/1105 may be equal to 2 when both the width and the height of the template region 61/62 are less than or equal to 16. For example, the height of the above template reference region 1101/1104 and the width of the left template reference region 1102/1105 may be equal to 1 when either the width or the height of the template region 61/62 is greater than or equal to 32.

For example, the width of the above template reference region 1101/1104 may be equal to the width of the template region 61/62 and the height of the left template reference region 1102/1105 may be equal to the height of the template region 61/62, if the replaced conventional intra mode index is greater than 18 and less than 50. For example, the width of the above template reference region 1101/1104 may be equal to twice the width of the template region 61/62, and the height of the left template reference region 1102/1105 may be equal to twice the height of the template region 61/62 when the replaced conventional intra mode index is less than 18 or greater than 50.

In some implementations, the size of the template reference region may alternatively be determined based on the replaced first intra prediction mode (e.g., the conventional intra mode index) and the size of the block unit 40.

For example, the height of the above template reference region 1101/1104 and the width of the left template reference region 1102/1105 may be equal to 2 when both the width W and the height H of the block unit 40 are less than, or equal to, 16. For example, the height of the above template reference region 1101/1104 and the width of the left template reference region 1102/1105 may be equal to 1 when either the width W or the height H of the block unit 40 is greater than, or equal to, 32.

For example, the width of the above template reference region 1101/1104 may be equal to the width W of the block unit 40 and the height of the left template reference region 1102/1105 may be equal to the height H of the block unit 40 when the replaced conventional intra mode index is greater than 18 and less than 50. For example, the width of the above template reference region 1101/1104 may be twice the width W of the block unit 40, and the height of the left template reference region 1102/1105 may be twice the height H of the block unit 40 when the replaced conventional intra mode index is less than 18 or greater than 50.

Referring back to FIG. 3, at block 370, the method/process 300 may reconstruct (e.g., by the decoder module 124) the block unit based on the predicted samples of the block unit.

In some implementations, the decoder module 124 may add multiple residual components to the predicted samples of the block unit 40 (e.g., the prediction of the samples in the block unit determined at block 360) to reconstruct the block unit 40. The residual components may be determined from the bitstream.

Once the block unit is reconstructed, the method/process 300 may then end. By repeating the method/process 300, multiple block units may be reconstructed and, as a result, the image frames included in the video data may be reconstructed accordingly.

Figure 12:
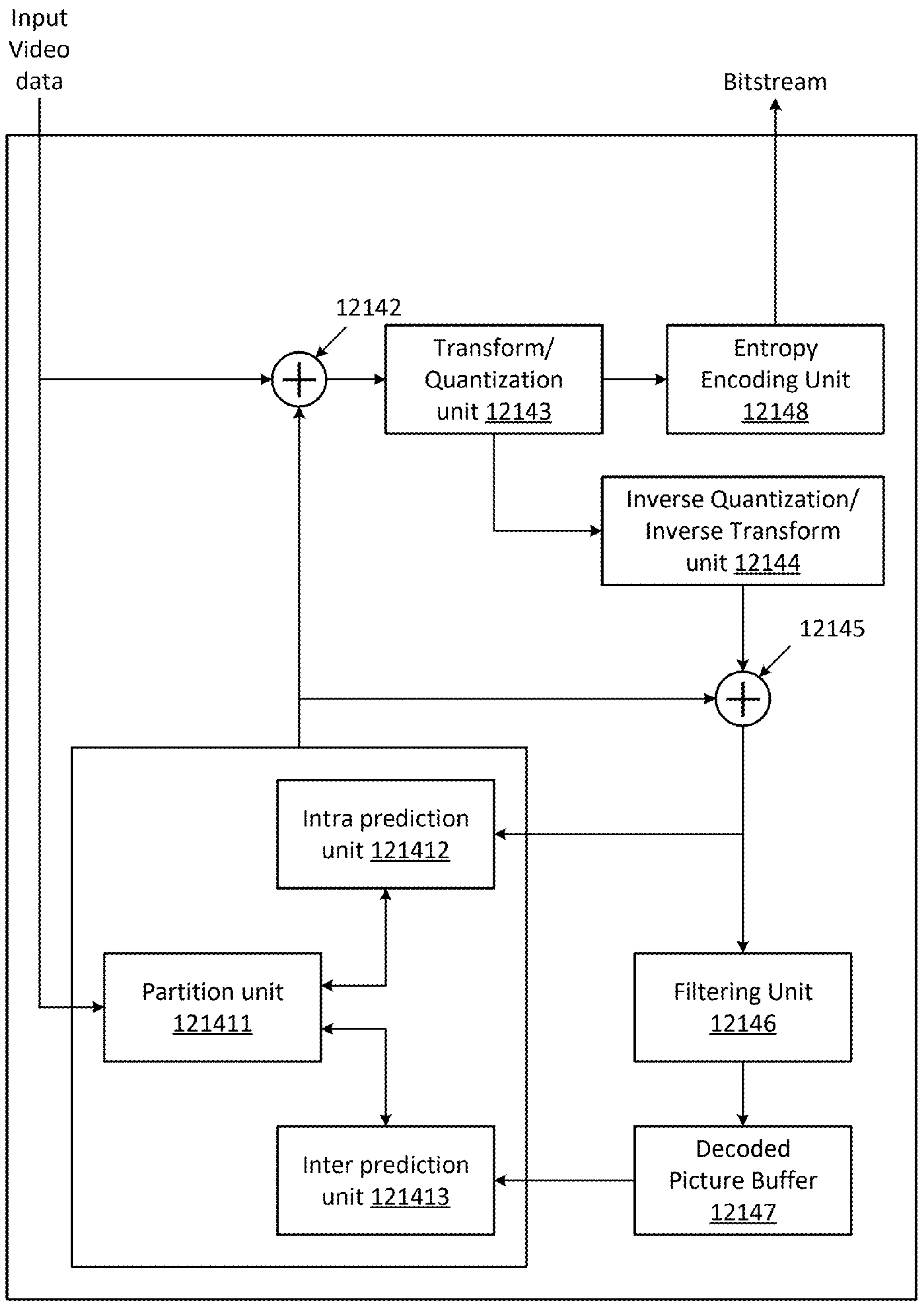
FIG. 12 is a block diagram illustrating an encoder module of the first electronic device illustrated in FIG. 1, in accordance with one or more example implementations of this disclosure.

FIG. 12 is a block diagram illustrating an encoder module 114 of the first electronic device 110 illustrated in FIG. 1, in accordance with one or more example implementations of this disclosure. The encoder module 114 may include a prediction processor (e.g., a prediction processing unit 12141), at least a first summer (e.g., a first summer 12142) and a second summer (e.g., a second summer 12145), a transform/quantization processor (e.g., a transform/quantization unit 12143), an inverse quantization/inverse transform processor (e.g., an inverse quantization/inverse transform unit 12144), a filter (e.g., a filtering unit 12146), a decoded picture buffer (e.g., a decoded picture buffer 12147), and an entropy encoder (e.g., an entropy encoding unit 12148). The prediction processing unit 12141 of the encoder module 114 may further include a partition processor (e.g., a partition unit 121411), an intra prediction processor (e.g., an intra prediction unit 121412), and an inter prediction processor (e.g., an inter prediction unit 121413).

The encoder module 114 may receive the source video and encode the source video to output a bitstream. The encoder module 114 may receive source video including multiple image frames and then divide the image frames according to a coding structure. Each of the image frames may be divided into at least one image block.

The at least one image block may include a luminance block having multiple luminance samples and at least one chrominance block having multiple chrominance samples. The luminance block and the at least one chrominance block may be further divided to generate macroblocks, CTUs, CBs, sub-divisions thereof, and/or other equivalent coding units.

The encoder module 114 may perform additional sub-divisions of the source video. It should be noted that the disclosed implementations are generally applicable to video coding regardless of how the source video is partitioned prior to and/or during the encoding.

During the encoding process, the prediction processing unit 12141 may receive a current image block of a specific one of the image frames. The current image block may be the luminance block or one of the chrominance blocks in the specific image frame.

The partition unit 121411 may divide the current image block into multiple block units. The intra prediction unit 121412 may perform intra-predictive coding of a current block unit relative to one or more neighboring blocks in the same frame as the current block unit in order to provide spatial prediction. The inter prediction unit 121413 may perform inter-predictive coding of the current block unit relative to one or more blocks in one or more reference image blocks to provide temporal prediction.

The prediction processing unit 12141 may select one of the coding results generated by the intra prediction unit 121412 and the inter prediction unit 121413 based on a mode selection method, such as a cost function. The mode selection method may be a rate-distortion optimization (RDO) process.

The prediction processing unit 12141 may determine the selected coding result and provide a predicted block corresponding to the selected coding result to the first summer 12142 for generating a residual block and to the second summer 12145 for reconstructing the encoded block unit. The prediction processing unit 12141 may further provide syntax elements, such as motion vectors, intra-mode indicators, partition information, and/or other syntax information, to the entropy encoding unit 12148.

The intra prediction unit 121412 may intra-predict the current block unit. The intra prediction unit 121412 may determine an intra prediction mode directed toward a reconstructed sample neighboring the current block unit in order to encode the current block unit.

The intra prediction unit 121412 may encode the current block unit using various intra prediction modes. The intra prediction unit 121412 of the prediction processing unit 12141 may select an appropriate intra prediction mode from the selected modes. The intra prediction unit 121412 may encode the current block unit using a cross-component prediction mode to predict one of the two chroma components of the current block unit based on the luma components of the current block unit. The intra prediction unit 121412 may predict a first one of the two chroma components of the current block unit based on the second of the two chroma components of the current block unit.

The inter prediction unit 121413 may inter-predict the current block unit as an alternative to the intra prediction performed by the intra prediction unit 121412. The inter prediction unit 121413 may perform motion estimation to estimate motion of the current block unit for generating a motion vector.

The motion vector may indicate a displacement of the current block unit within the current image block relative to a reference block unit within a reference image block. The inter prediction unit 121413 may receive at least one reference image block stored in the decoded picture buffer 12147 and estimate the motion based on the received reference image blocks to generate the motion vector.

The first summer 12142 may generate the residual block by subtracting the prediction block determined by the prediction processing unit 12141 from the original current block unit. The first summer 12142 may represent the component or components that perform this subtraction.

The transform/quantization unit (143 may apply a transform to the residual block in order to generate a residual transform coefficient and then quantize the residual transform coefficients to further reduce the bit rate. The transform may be one of a DCT, DST, AMT, MDNSST, HyGT, signal-dependent transform, KLT, wavelet transform, integer transform, sub-band transform, and a conceptually similar transform.

The transform may convert the residual information from a pixel value domain to a transform domain, such as a frequency domain. The degree of quantization may be modified by adjusting a quantization parameter.

The transform/quantization unit 12143 may perform a scan of the matrix including the quantized transform coefficients. Alternatively, the entropy encoding unit 12148 may perform the scan.

The entropy encoding unit 12148 may receive multiple syntax elements from the prediction processing unit 12141 and the transform/quantization unit (143, including a quantization parameter, transform data, motion vectors, intra modes, partition information, and/or other syntax information. The entropy encoding unit 12148 may encode the syntax elements into the bitstream.

The entropy encoding unit 12148 may entropy encode the quantized transform coefficients by performing CAVLC, CABAC, SBAC, PIPE coding, or another entropy coding technique to generate an encoded bitstream. The encoded bitstream may be transmitted to another device (e.g., the second electronic device 120, as shown in FIG. 1) or archived for later transmission or retrieval.

The inverse quantization/inverse transform unit 12144 may apply inverse quantization and inverse transformation to reconstruct the residual block in the pixel domain for later use as a reference block. The second summer 12145 may add the reconstructed residual block to the prediction block provided by the prediction processing unit 12141 in order to produce a reconstructed block for storage in the decoded picture buffer 12147.

The filtering unit 12146 may include a deblocking filter, an SAO filter, a bilateral filter, and/or an ALF to remove blocking artifacts from the reconstructed block. Other filters (in loop or post loop) may be used in addition to the deblocking filter, the SAO filter, the bilateral filter, and the ALF. Such filters are not illustrated for brevity and may filter the output of the second summer 12145.

The decoded picture buffer 12147 may be a reference picture memory that stores the reference block to be used by the encoder module 114 to encode video, such as in intra-coding or inter-coding modes. The decoded picture buffer 12147 may include a variety of memory devices, such as DRAM (e.g., including SDRAM), MRAM, RRAM, or other types of memory devices. The decoded picture buffer 12147 may be on-chip with other components of the encoder module 114 or off-chip relative to those components.

The method/process 300 for decoding/encoding video data may be performed by the first electronic device 110. The encoder module 114 may receive the video data. The video data received by the encoder module 114 may be a video. The encoder module 114 may determine a block unit from an image frame of the video data. The encoder module 114 may divide the image frame to generate multiple CTUs, and further divide one of the CTUs to determine the block unit according to one of multiple partition schemes based on any video coding standard.

With respect to the block unit, the encoder module 114 may construct a TIMD candidate list for the block unit, and determine a selected set of intra prediction modes based on the TIMD list. Details for the construction and determination are described above (e.g., as illustrated with blocks 330 and 340 of FIG. 3) and therefore are not repeated herein.

The encoder module 114 may use the method/process 300 to substitute intra prediction mode(s) in the selected set with matrix-based intra prediction mode(s) to form a substituted set of intra prediction modes. Details for the substitution are described above (e.g., as shown in block 350 of FIG. 3) and therefore are not repeated herein.

The encoder module 114 may use the method/process 300 to determine predicted samples of the block unit based on the substituted set of intra prediction modes, and to further reconstruct the block unit based on the predicted samples of the block unit. Details for the prediction determination and reconstruction for the block unit are described above (e.g., as shown in blocks 360 and 370 of FIG. 3) and therefore are not repeated herein. The reconstructed block unit may include multiple reconstructed samples, which may be used as references for predicting subsequent blocks in the video data.

The disclosed implementations are to be considered in all respects as illustrative and not restrictive. It should also be understood that the present disclosure is not limited to the specific disclosed implementations, but that many rearrangements, modifications, and substitutions are possible without departing from the scope of the present disclosure.

What is claimed is:

1. An electronic device for decoding video data, the electronic device comprising:

at least one processor; and at least one non-transitory computer-readable medium coupled to the at least one processor and storing one or more computer-executable instructions that, when executed by the at least one processor, cause the electronic device to:

receive the video data;

determine a block unit from an image frame retrieved from the video data;

construct a template-based intra mode derivation (TIMD) candidate list for the block unit, the TIMD candidate list comprising a plurality of intra prediction modes;

determine a selected set of intra prediction modes from the plurality of intra prediction modes of the TIMD candidate list;

substitute at least one intra prediction mode in the selected set of intra prediction modes with at least one matrix-based intra prediction mode to form a substituted set of intra prediction modes;

determine a plurality of predicted samples of the block unit based on the substituted set of intra prediction modes; and reconstruct the block unit based on the plurality of predicted samples of the block unit.

2. The electronic device of claim 1, wherein the one or more computer-executable instructions, when executed by the at least one processor, further cause the electronic device to:

determine a template region for the block unit, the template region comprising at least one of a first region that is neighboring the block unit and above the block unit and a second region that is neighboring the block unit and to the left of the block unit, the template region being reconstructed as a template reconstruction;
determine a plurality of template predictions of the template region based on the plurality of intra prediction modes of the TIMD candidate list;
calculate a plurality of template costs for the plurality of intra prediction modes of the TIMD candidate list based on the template reconstruction and the plurality of template predictions; and
determine the selected set of intra prediction modes based on the plurality of template costs.

3. The electronic device of claim 1, wherein the selected set of intra prediction modes comprises a plurality of first intra prediction modes, the substituted set of intra prediction modes comprises a plurality of second intra prediction modes, and determining the plurality of predicted samples of the block unit based on the substituted set of intra prediction modes comprises:
determining a plurality of weights for the plurality of first intra prediction modes based on a plurality of template costs associated with the plurality of first intra prediction modes; and
determining the plurality of predicted samples of the block unit based on the plurality of weights and the plurality of second intra prediction modes.

4. The electronic device of claim 1, wherein the selected set of intra prediction modes comprises a plurality of first intra prediction modes, the substituted set of intra prediction modes comprises a plurality of second intra prediction modes, and determining the plurality of predicted samples of the block unit based on the substituted set of intra prediction modes comprises:
determining a plurality of weights for the plurality of second intra prediction modes based on a plurality of template costs associated with the plurality of second intra prediction modes; and
determining the plurality of predicted samples of the block unit based on the plurality of weights and the plurality of second intra prediction modes.

5. The electronic device of claim 1, wherein substituting the at least one intra prediction mode in the selected set of intra prediction modes with the at least one matrix-based intra prediction mode to form the substituted set of intra prediction modes comprises:
determining whether to substitute a first intra prediction mode in the selected set of intra prediction modes with a first matrix-based intra prediction mode associated with the first intra prediction mode based on a block size of the block unit and a mode type of the first intra prediction mode.

6. The electronic device of claim 5, wherein substituting the at least one intra prediction mode in the selected set of intra prediction modes with the at least one matrix-based intra prediction mode to form the substituted set of intra prediction modes further comprises:
substituting the first intra prediction mode in the selected set of intra prediction modes with the first matrix-based intra prediction mode associated with the first intra prediction mode when each of a block width and a block height is smaller than or equal to 16 pixels, and when the mode type is one of a planar mode, a direct current (DC) mode, and an angular mode having a mode index of (2+2*k), wherein k is a positive constant.

7. The electronic device of claim 5, wherein substituting the at least one intra prediction mode in the selected set of intra prediction modes with the at least one matrix-based intra prediction mode to form the substituted set of intra prediction modes further comprises:
substituting the first intra prediction mode in the selected set of intra prediction modes with the first matrix-based intra prediction mode associated with the first intra prediction mode when at least one of a block width and a block height is greater than or equal to 32 pixels, and when the mode type is one of a planar mode, a direct current (DC) mode, and an angular mode having a mode index of (2+4*k), wherein k is a positive constant.

8. The electronic device of claim 1, wherein substituting the at least one intra prediction mode in the selected set of intra prediction modes with the at least one matrix-based intra prediction mode comprises:
decoding a flag from the video data; and
determining whether to substitute a first intra prediction mode in the selected set of intra prediction modes with a first matrix-based intra prediction mode associated with the first intra prediction mode based on the flag.

9. The electronic device of claim 1, wherein constructing the TIMD candidate list for the block unit comprises:
including a planar mode, a direct current (DC) mode, a plurality of angular modes, at least one block vector candidate, and a plurality of most probable modes into the TIMD candidate list, the at least one block vector candidate being determined based on a plurality of neighboring blocks of the block unit.

10. An electronic device for encoding video data, the electronic device comprising:
at least one processor; and
at least one non-transitory computer-readable medium coupled to the at least one processor and storing one or more computer-executable instructions that, when executed by the at least one processor, cause the electronic device to:
receive the video data;
determine a block unit from an image frame retrieved from the video data;
construct a template-based intra mode derivation (TIMD) candidate list for the block unit, the TIMD candidate list comprising a plurality of intra prediction modes;
determine a selected set of intra prediction modes from the plurality of intra prediction modes of the TIMD candidate list;
substitute at least one intra prediction mode in the selected set of intra prediction modes with at least one matrix-based intra prediction mode to form a substituted set of intra prediction modes;
determine a plurality of predicted samples of the block unit based on the substituted set of intra prediction modes; and
reconstruct the block unit based on the plurality of predicted samples of the block unit.

11. The electronic device of claim 10, wherein the one or more computer-executable instructions, when executed by the at least one processor, further cause the electronic device to:
determine a template region for the block unit, the template region comprising at least one of a first region that is neighboring the block unit and above the block unit and a second region that is neighboring the block unit and to the left of the block unit, the template region being reconstructed as a template reconstruction;

determine a plurality of template predictions of the template region based on the plurality of intra prediction modes of the TIMD candidate list;

calculate a plurality of template costs for the plurality of intra prediction modes of the TIMD candidate list based on the template reconstruction and the plurality of template predictions; and determine the selected set of intra prediction modes based on the plurality of template costs.

12. The electronic device of claim 10, wherein the selected set of intra prediction modes comprises a plurality of first intra prediction modes, the substituted set of intra prediction modes comprises a plurality of second intra prediction modes, and determining the plurality of predicted samples of the block unit based on the substituted set of intra prediction modes comprises:

determining a plurality of weights for the plurality of first intra prediction modes based on a plurality of template costs associated with the plurality of first intra prediction modes; and determining the plurality of predicted samples of the block unit based on the plurality of weights and the plurality of second intra prediction modes.

13. The electronic device of claim 10, wherein the selected set of intra prediction modes comprises a plurality of first intra prediction modes, the substituted set of intra prediction modes comprises a plurality of second intra prediction modes, and determining the plurality of predicted samples of the block unit based on the substituted set of intra prediction modes comprises:

determining a plurality of weights for the plurality of second intra prediction modes based on a plurality of template costs associated with the plurality of second intra prediction modes; and determining the plurality of predicted samples of the block unit based on the plurality of weights and the plurality of second intra prediction modes.

14. The electronic device of claim 10, wherein substituting the at least one intra prediction mode in the selected set of intra prediction modes with the at least one matrix-based intra prediction mode to form the substituted set of intra prediction modes comprises:

determining whether to substitute a first intra prediction mode in the selected set of intra prediction modes with a first matrix-based intra prediction mode associated with the first intra prediction mode based on a block size of the block unit and a mode type of the first intra prediction mode.

15. The electronic device of claim 14, wherein substituting the at least one intra prediction mode in the selected set of intra prediction modes with the at least one matrix-based intra prediction mode to form the substituted set of intra prediction modes further comprises:

substituting the first intra prediction mode in the selected set of intra prediction modes with the first matrix-based intra prediction mode associated with the first intra prediction mode when each of a block width and a block height is smaller than or equal to 16 pixels, and when the mode type is one of a planar mode, a direct current (DC) mode, and an angular mode having a mode index of (2+2*k), wherein k is a positive constant.

16. The electronic device of claim 14, wherein substituting the at least one intra prediction mode in the selected set of intra prediction modes with the at least one matrix-based intra prediction mode to form the substituted set of intra prediction modes further comprises:

substituting the first intra prediction mode in the selected set of intra prediction modes with the first matrix-based intra prediction mode associated with the first intra prediction mode when at least one of a block width and a block height is greater than or equal to 32 pixels, and when the mode type is one of a planar mode, a direct current (DC) mode, and an angular mode having a mode index of (2+4*k), wherein k is a positive constant.

17. The electronic device of claim 10, wherein substituting the at least one intra prediction mode in the selected set of intra prediction modes with the at least one matrix-based intra prediction mode comprises:

encoding a flag into a bitstream, the flag indicating the at least one intra prediction mode.

18. The electronic device of claim 10, wherein constructing the TIMD candidate list for the block unit comprises:

including a planar mode, a direct current (DC) mode, a plurality of angular modes, at least one block vector candidate, and a plurality of most probable modes into the TIMD candidate list, the at least one block vector candidate being determined based on a plurality of neighboring blocks of the block unit.

19. A non-transitory machine-readable medium of an electronic device storing one or more computer-executable instructions for decoding video data, the one or more computer-executable instructions, when executed by at least one processor of the electronic device, causing the electronic device to:

receive the video data;

determine a block unit from an image frame retrieved from the video data;

construct a template-based intra mode derivation (TIMD) candidate list for the block unit, the TIMD candidate list comprising a plurality of intra prediction modes;

determine a selected set of intra prediction modes from the plurality of intra prediction modes of the TIMD candidate list;

substitute at least one intra prediction mode in the selected set of intra prediction modes with at least one matrix-based intra prediction mode to form a substituted set of intra prediction modes;

determine a plurality of predicted samples of the block unit based on the substituted set of intra prediction modes; and reconstruct the block unit based on the plurality of predicted samples of the block unit.

* * * * *